United States Patent [19]
Komura et al.

[11] Patent Number: 5,311,173
[45] Date of Patent: May 10, 1994

[54] NAVIGATION SYSTEM AND METHOD USING MAP DATA

[75] Inventors: Fuminobu Komura, Yokohama; Yoshikazu Hirayama, Katsuta; Koichi Homma, Yokohama; Makoto Kato, Kawasaki; Takanori Shibata, Hitachi; Yoji Matsuoka, Mito; Akira Kagami, Kawasaki; Michitaka Kosaka, Sagamihara, all of Japan

[73] Assignee: Hitachi, Ltd., Tokyo, Japan

[21] Appl. No.: 758,302

[22] Filed: Aug. 28, 1991

Related U.S. Application Data

[63] Continuation of Ser. No. 407,359, Sep. 14, 1989.

[30] Foreign Application Priority Data

Sep. 16, 1988 [JP] Japan ................. 63-229965

[51] Int. Cl.$^5$ ............................. G08G 1/123
[52] U.S. Cl. .................. 340/995; 73/178 R; 340/988; 364/449
[58] Field of Search .............. 340/995, 990, 988; 73/178 R; 364/449, 444

[56] References Cited

U.S. PATENT DOCUMENTS

| | | | |
|---|---|---|---|
| 3,947,807 | 3/1976 | Tyler et al. ............ | 340/989 |
| 4,758,959 | 7/1988 | Thoone et al. ......... | 340/990 |
| 4,774,672 | 9/1988 | Tsunoda et al. ....... | 340/995 |
| 4,786,908 | 11/1988 | Runnalls ............... | 364/449 |
| 4,812,845 | 3/1989 | Yamada et al. ........ | 340/995 |
| 4,887,081 | 12/1989 | Iihoshi et al. .......... | 340/990 |
| 4,964,052 | 10/1990 | Ohe ....................... | 364/449 |
| 4,970,652 | 11/1990 | Nagashima ........... | 340/995 |
| 5,016,007 | 5/1991 | Iihoshi et al. .......... | 340/995 |
| 5,170,165 | 12/1992 | Iihoshi et al. .......... | 340/995 |

FOREIGN PATENT DOCUMENTS

| | | |
|---|---|---|
| 166547 | 1/1986 | European Pat. Off. . |
| 270911 | 6/1988 | European Pat. Off. . |
| 2341162 | 2/1975 | Fed. Rep. of Germany . |
| 3439000 | 4/1986 | Fed. Rep. of Germany . |
| 61-243318 | 10/1986 | Japan . |
| 62-166210 | 5/1987 | Japan . |
| 63-066414 | 3/1988 | Japan . |
| 1-140015 | 6/1989 | Japan . |
| 1-162110 | 6/1989 | Japan . |

OTHER PUBLICATIONS

"Nikkei Electronics", Nov. 16, 1987, pp. 119–130.
"Nikkei Electronics", Sep. 21, 1987, pp. 88–89.
SAE Technical Paper Series, Feb. 1987, "The Utility of Low Cost Vehicle Navigation Systems for Fleet Management Applications", S. K. Honey et al, pp. 67–71.

*Primary Examiner*—Brent A. Swarthout
*Attorney, Agent, or Firm*—Fay, Sharpe, Beall, Fagan, Minnich & McKee

[57] ABSTRACT

In a navigation system which has sensors for detecting a running distance, an azimuth, etc. of a vehicle, and a memory for storing map data; a probability density of a position of the vehicle is calculated on the basis of the sensor outputs and the map data for each of quantization units with which a probability computation determined by detection accuracies of the sensors and quantization of the map data can be executed. In addition, a final stage calculation of DP matching between trajectory data obtained from the on-board sensor data from a start point of the vehicle until a current time and a candidate route estimated from the road map data is iteratively executed, whereby a plurality of estimative vehicular positions and uncertainties (costs) corresponding to the respective estimative positions are iteratively evaluated, and a correct vehicular position is estimated by selecting at least one estimative vehicular position of low uncertainty (cost).

35 Claims, 11 Drawing Sheets

CALCULATION STOPPING POINT

CURRENT POINT j=N

| # | x-COORDINATE | y-COORDINATE | NEIGHBOURING NODE DATA | | | |
|---|---|---|---|---|---|---|
| 1 | | | 3 | 12 | | |
| 2 | | | 3 | 11 | | |
| 3 | | | 1 | 2 | 4 | |
| 4 | | | 3 | 5 | | |
| 5 | | | 4 | 6 | 7 | |

NODE NUMBER

NAVIGATION SYSTEM AND METHOD USING MAP DATA

This application is a continuation of application Ser. No. 07/407,359, filed Sep. 14, 1989, now abandoned.

BACKGROUND OF THE INVENTION

1. Field of the Invention

The present invention relates to a navigation system for vehicles such as automobiles, and more particularly to an information processing system and method which are well suited to estimate the position of a vehicle at high precision by the use of map data.

2. Description of the Prior Art

As stated in, for example, "Nikkei Electronics" dated Nov. 16, 1987, pp. 119-130, a prior-art on-board navigation system for a land surface vehicle such as automobile employs a method wherein the position of the vehicle itself, which is estimated by the use of a travel distance detected by a car speed sensor mounted on the vehicle, as well as a current azimuth angle obtained from a steering angle detected by a steering angle sensor or an attitude angle detected by a magnetic sensor similarly mounted, is displayed in superposition on map data.

There is also a method wherein, in order to heighten the estimation accuracy of the position of the vehicle itself, a receiver in a GPS (Global Positioning System) or a receiver for location beacons (sign posts), which are radio beacons installed on roads for transmitting the absolute positional information items thereof, is mounted, and the received information of the system or beacon is used in combination with the data of the aforementioned travel distance or current azimuth angle.

Further, there has been known a method wherein, in order to prevent an estimated current position from missing a road on a map because of an error, an estimative current position to be displayed is corrected onto the road by the use of the positional information of the road of map data. An example of the method is discussed in the official gazette of Japanese Patent Application Laid-open No. 56910/1986.

The first prior-art technique mentioned above is such that, on the basis of the initial position of the vehicle at the start of the travel of the vehicle or at the start of the display of the position of the vehicle, the travel distance and the current azimuth angle detected every moment are integrated to evaluate the current position at each of later points of time. Therefore, it has the disadvantage that the errors of the initial position, travel distance and current azimuth angle diverge accumulatively.

Since the second prior-art technique can directly estimate the position of the vehicle by the use of the GPS or the location beacons, a positional error does not diverge with time. Nevertheless, an error of several tens of meters to several hundred meters remains.

With the two prior-art techniques, accordingly, there has been the problem that, when the estimated current position is displayed in superposition on the map, the displayed position misses the road in spite of the traveling of the vehicle on the road.

In the third prior-art technique, the probability density of the current position at every moment is computed, and it is compared with a road position in the map data. When a place on the road whose probability exceed a certain fixed threshold value has been detected, it is displayed as being the current position. Herein, the probability density is assumed to be of a Gaussian distribution, and it is approximated with a small number of parameters. This method has had the problem that actually the probability density falls into a shape different from the Gaussian distribution on account of speed regulation, diversion, etc., so the estimation does not become optimal. Another problem is that, in someways of selecting the threshold value, the current position is forcibly displayed on the road in a case where the vehicle actually misses the road on which the current position is displayed and where it lies at a position, such as a back street, which is not contained in the road information of the map data.

Meanwhile, the positional accuracy of a vehicle has been enhanced by the following method: Road map data recorded on a CD-ROM is displayed on the CRT of a dashboard, and the start point of the vehicle is input on the map of the CRT by a cursor when the vehicle starts traveling. Then, the current position is displayed on the map of the CRT on the basis of a car speed and information on a traveling direction from a terrestrial magnetism sensor. In particular, an estimated trajectory is compared with a route pattern on the map, and the positional information and the map pattern are checked up at the intersection of roads or the bending point of a road, so as to estimate the position of the vehicle believed correct.

In this case, however, the errors of the azimuth and the car speed are corrected only at the travel of the vehicle through the featuring point and on each occasion. Accordingly, there has not been considered the problem that, once the vehicle has entered an erroneous route, the correction fails.

Further, the above method considers only the local correction on the error of the estimative current position attributed to the accumulation of the errors of the preceding azimuths and car speeds. As another problem, accordingly, there has been such a possibility that the estimated current position on the CRT will miss a road, or that the vehicle will enter a road not leading to a destination, while resorting to the estimated positional information which is different from the actual current position.

SUMMARY OF THE INVENTION

An object of the present invention is to provide a system and a method which heighten the estimation accuracy of the current position of a vehicle so as to present a display conforming to a road map.

Another object of the present invention is to provide an on-board navigation system in which an estimated trajectory based on information items from several sensors is compared with the shape of a road in a memory device such as CD-ROM, thereby making it possible to sequentially correct an estimative current position and simultaneously to evaluate the certainty of estimation.

In order to accomplish the objects, the present invention is constructed as follows:

A navigation system using map data, which has a first sensor for detecting a travel distance of a vehicle and/or a second sensor for detecting a current azimuth, a memory for storing the map data, and a data processor, is characterized in that at least one of the travel distance and the current azimuth is detected by at least one of said first and second sensors, and that quantization units, each of which permits execution of a probability calculation determined by a detection accuracy of said sensor and quantization of said map data, are set, whereupon as regards each of said quantization units, a probability density of a current position is calculated from said map data and said at least one of the detected values by said data processor.

Besides, a navigation system using map data, which has a speed sensor, a current azimuth sensor, a memory for storing the road map data, and a processor, is characterized in that a speed and an azimuth of a vehicle are respectively sensed by said speed sensor and said current azimuth sensor, that estimative current positions of the vehicle are estimated according to DP matching calculations on the basis of the sensed speed and azimuth and the map data, that coordinates of a plurality of places on roads as the estimated current positions are stored together with uncertainties (costs) corresponding to the respective estimated current positions, and that estimative current positions at a next time and uncertainties corresponding to them are evaluated from a speed and an azimuth sensed and the road map data on the basis of the estimated current positions and the uncertainties thereof, whereby the estimative current positions are iteratively updated.

Now, the operating principles and functions of the present invention will be elucidated before the description of embodiments.

First, in a case where, regarding the calculation units of the map data, current position probability densities are evaluated in respective units obtained by quantizing the calculation units, the following functions are attained:

The data processor evaluates the location probability of the vehicle in each place, namely, the probability density of the current position every moment on the basis of the detected values of the travel distance and traveling direction and the map data. A point at which the probability takes the maximum value, is set as the estimative value of the current position. Here, a posterior conditional probability is calculated using the prior probability of the current position which takes the large value on a road given by the map data and small values in the other places, so that the estimative value of the current position does not err and miss the road badly. Moreover, when the respective positions are displayed in superposition of the map data in, for example, different colors in accordance with the probability densities, the user of the navigation system can know the estimated situation of the current positions more precisely every moment, and the risk at which the user is puzzled by an estimation error can be made less than with a method wherein only one current position is displayed.

Here, an estimation system for use in the present invention will be described.

Let's consider a stochastic process expressed by the following state equation which is obtained through sampling at suitable time intervals:

$$x_{i+1} = f_i(x_i) + d_i \quad (1)$$

$(i = 0, 1, \ldots)$ where x indicates a state vector of order n, f a vector function of order n, and $d_i$ an external force vector of order n. Letter "i" is a suffix denotative of time. It is assumed that the probability density $p(x_0)$ of $x_0$ is given as prior information. On the other hand, it is assumed that observation data on an external force as expressed by the following observation equation is obtained every time:

$$y_i = d_i + G_i w_i \quad (2)$$

$(i = 0, 1, \ldots)$ where y denotes an observation vector of order n, and w denotes a white noise vector of order n, the probability density $p(w)$ of which is assumed to be given.

Further, it is assumed that a conditional probability density $p(x_{i+1}|x_i)$ $(i = 0, 1, \ldots)$ is given as a restrictive condition. On this occasion, as the first system, there is considered the estimation problem of finding the state $x_N$ which maximizes a posterior conditional probability:

$$P(x_N | y_0, \ldots, y_{N-1}) \quad (3)$$

when the observation data $y_i (i = 0, \ldots, N-1)$ is given.

The solution of this problem is given as stated below. On the basis of the models of Eqs. (1) and (2), Eq. (3) is expressed as follows in accordance with Bayes' rule:

$$p(x_N | y_0, \ldots, y_{N-1}) = \int p(y_{N-1} | x_{N-1}, x_N) \cdot \quad (4)$$
$$p(x_N | x_{N-1}) / p(y_{N-1}) \cdot p(x_{N-1} | y_0, \ldots, y_{N-2}) \cdot dx_{N-1}$$

Here, for N=1, the following holds:

$$P(x_1 | y_0) = \int p(y_0 | x_0, x_1) \cdot p(x_1 | x_0) / P(y_0) \cdot p(x_0) \cdot dx_0 \quad (5)$$

Accordingly, $p(x_1 | y_0)$ can be obtained owing to Eq. (5) on the basis of the models of Eqs. (1) and (2), and $p(x_N | y_0, \ldots, y_{N-1})$ can be obtained in the ascending series of N owing to Eq. (4) for $N \geq 2$. Thus, the estimated values of the desired state vectors are obtained as the states $x_N$ which maximize the aforementioned probability for the respective N values. The above is the solution of the estimation problem based on the first system.

Next, as the second system, there is considered the estimation problem of finding the state series $x_i (i = 0, 1, \ldots, N)$ which maximizes a posterior conditional probability:

$$P(x_0, x_1, \ldots, x_N | y_0, \ldots, y_{N-1}) \quad (6)$$

when the observation data $y_i (i = 0, \ldots, N-1)$ is similarly given.

The solution of this problem is given as stated below. On the basis of the models of Eqs. (1) and (2), Eq. (6) is expressed as follows in accordance with Bayes' rule:

$$p(x_0, x_1, \ldots, x_N | y_0, \ldots, y_{N-1}) = \quad (7)$$
$$p(x_0, x_1, \ldots, x_{N-1} | y_0, \ldots, y_{N-2}) \cdot p(x_N | x_{N-1}) \cdot$$
$$p(y_{N-1} | x_{N-1}, x_N) / p(y_{N-1})$$

Both the sides of Eq. (7) are transformed into:

$$I_N = I_{N-1} \times C(x_N, x_{N-1}) \quad (8)$$

Here, $$I_N = p(x_0, x_1, \ldots, x_N | y_0, \ldots, y_{N-1})$$
$$C(x_N, x_{N-1}) = p(y_{N-1} | x_{N-1}, x_N) \cdot p(x_N | x_{N-1}) / p(y_{N-1})$$

Although the problem is to find the states $x_0, x_1, \ldots$ and $x_N$ maximizing $I_N$, the following maximum value $J_N(x_N)$ with the state $x_N$ assumed given shall be considered here:

$$J_N(x_N) = \max I_N(x_N) \quad (9)$$

From Eq. (8), the following is obtained:

$$J_N(x_N) = \max_{x_{N-1}} \{J_{N-1}(x_{N-1}) \times C(x_N, x_{N-1})\} \quad (10)$$

$N \geq 2$ where $$J_1(x_1) = \max_{x_0} p(x_0, x_1 | y_0) \quad (11)$$

holds. $J_1(x_1)$ can be computed by Eq. (11) on the basis of the models of Eqs. (1) and (2), and $C(x_N, x_{N-1})$ can be computed by Eq. (8), so that $J_N(x_N)$ is evaluated in the ascending series of N from N=2 by Eq. (10).

Assuming that the maximum value $J_N(x_N)$ has been obtained in this way, $x_N$ maximizing it becomes the state $x_N$ among the desired states $x_0, x_1, \ldots$ and $x_N$ maximizing the probability $I_N$, because Eq. (9) is transformed as follows:

$$\max_{x_N} J_N(x_N) = \max_{x_0, x_1, \ldots, x_N} I_N \quad (12)$$

The states $x_1, \ldots$ and $x_{N-1}$ are obtained by solving Eq. (10) in the descending series of N on the basis of this state $x_N$, and the last state $x_0$ is obtained from Eq. (11). The above is the solution of the estimation problem based on the second system. Incidentally, the posterior conditional probability (6) on this occasion is given by:

$$P(x_0, x_1, \ldots, x_N | y_1, \ldots, y_N) = I_N \quad (13)$$

in view of Eq. (8).

According to the above procedure, the probability density is permitted to be precisely computed even when it is not in the shape of the Gaussian distribution.

Secondly, as to a case where an estimated current position of low uncertainty (cost) is found from among the plurality of estimated current positions, the operating principles and the functions will be described.

Let's consider that a running trajectory estimated from only road data and on-board sensor data as shown in FIG. 23 is matched as the whole trajectory from a start point A to the point of the current time B. The running trajectory and the road data of candidate routes to-be-matched are expressed by the values $\theta_v(j)$ and $\theta_r(j)$ of the running azimuths of unit distances $\Delta S$ along the respective routes from the start point A. It is assumed that j=N holds at the point B.

Now, the matching between the running trajectory AB and the candidate route is executed by minimizing the following matching cost formula:

$$J = \sum_{j=1}^{N} \left\{ \theta_v \left( j + \sum_{k=1}^{j} \epsilon_k \right) - \theta_r(j) \right\}^2 + W \sum_{j=1}^{N} \epsilon_j^2 \quad (14)$$

The second term of the right-hand side of Eq. (14) denotes a cost concerning the transformation of the running trajectory AB, and the first term denotes the degree of disagreement of the transformed route. Letter W indicates the weighting of both the costs, and the degree at which the transformation is allowed heightens as the value W is smaller. Eq. (14) supposes a case where random errors are superposed on the speed data and the running azimuth data which are used for evaluating the running trajectory, and where the error of a travel or running distance is the accumulation of the speed errors. A trajectory transformation data sequence $\{\epsilon_j^*\}$ minimizing Eq. (14) gives how to transform the running trajectory AB for the purpose of the matching, and the minimum value $J^*$ gives a matching error which remains even in the optimal matching. Besides, where the estimative position B at the current time ought to lie on a road is known from the trajectory transformation data sequence $\{\epsilon_j^*\}$ which gives the optimal matching, and the estimate current position B which misses the road can be corrected onto the road B' in consideration of the whole route.

In a case where the minimum value $J^*$ of the matching cost is equal to or greater than a predetermined value, it can be judged that the matching itself is unreasonable. Moreover, when matching costs which are not the minimum but which are close to the minimum are set as $J^1, J^2, \ldots$ in the order of smaller values and trajectory transformation data sequences corresponding to them are set as $\{\epsilon_j^1\}, \{\epsilon_j^2\}, \ldots$, quasi-optimal matching operations can be a together with matching degrees.

In the above, there has been considered the case where the running trajectory is matched with the single road having no branch. In contrast, in a case where branches such as the intersection of roads are contained in the road data, all the routes along which the vehicle can run are picked up, whereupon the result of the single optimal matching determined for all the candidate routes and the results of a plurality of quasi-optimal matching operations are obtained.

The end point B of the running trajectory stretches with the running of the vehicle, and the distance along the trajectory increases from N to N+1, .... Also, the optimal trajectory transformation $\{\epsilon_j^*\}$ minimizing the matching cost of Eq. (14) is computed every moment with the running of the vehicle, and the corrected (displayed) current position B' changes every moment. However, the trajectory transformation $\{\epsilon_j^*\}: j=1-N$ up to the current position of j=N does not always give the preceding N terms of the optimal transformation $\{\epsilon_j^*\}: j=1-M$ concerning the later position of j=M (M>N). That is, even when the compensation of the position up to a certain point of time is erroneous, the optimal matching of the whole route including the subsequent trajectory is found out, whereby the error might be recovered. In particular, when the matching cost of Eq. (14) is decomposed depending upon the position j along each road as $$J^* = \sum_{j=1}^{N} J_j^* \quad (15)$$

$$J_j^* = \left\{ \theta_v \left( j + \sum_{k=1}^{j} \epsilon_k^* \right) - \theta_r(j) \right\}^2 + W \epsilon_j^{*2}$$

and the matching cost $J_j^*$ of each position is decided, it is possible to judge the occurrences of the following on the running route:

(i) Running deviating from road data
(ii) Error of on-board sensor data

Meanwhile, the optimal matching which minimizes Eq. (14) can be attained by DP (Dynamic Programming). As illustrated in FIG. 24(a), the positions j along the trajectory and the positions i along the road data are respectively taken on the axes of abscissas and ordinates, thereby to consider lattice points. As indicated in the figure, possible paths are drawn in three directions from each lattice point and are respectively given costs W, O and W, and a cost $\{\theta_r(i) - \theta_r(j)\}^2$ is also afforded onto the lattice point. Letting J*(i, j) denote that one of the operations of matching the position j of the trajectory to the position i of the road data which minimizes the cost of Eq. (14), it is the minimum value of the summation of the costs on the paths in the possible routes from the origin to the lattice point (i, j) in FIG. 24(a) and the cost on the lattice point. $\epsilon_j$ denotes any of $-1$, 0 and 1. The equation of the DP becomes:

$$J^*(i,j) = \min \begin{Bmatrix} J^*(i, j-1) + W \\ J^*(i-1, j-1) \\ J^*(i-2, j-1) + W \end{Bmatrix} + \{\theta_r(i) - \theta_v(j)\}^2 \quad (16)$$

Incidentally, the optimal matching cost J* at the point j is $i^{min} J^*(i, j)$. In the DP calculations, the minimum values J*(i, j) are obtained successively from the origin J*(0, 0)=0 in accordance with Eq. (16).

Assuming now that the running distance of the vehicle is j=N and that j*(i, N) has been obtained, j*(i, N+1) at the next vehicular position j=N+1 is evaluated by executing only the calculation of the final stage concerning j=N+1 in the DP calculations. Thus, the DP calculations can be realized by iterative processing conformed to the running of the vehicle. It is repeatedly stated that the estimated (compensated) vehicular position at j=N is found as the position i*(N) on a road minimizing J*(i, N).

Meanwhile, the above calculations spread radiately on a lattice in FIG. 24(b) as the vehicle runs, and the number of points at which J*(i, j) is to be computed increases in proportion to an increase in the positions j (the proceeding of the vehicle). Therefore, when the cost J*(i, j) has exceeded a threshold value, the calculation of the route passing the corresponding lattice point is stopped thenceforth so as to omit wasteful calculations and to hold the amount of calculations substantially constant at any time. Accordingly, the start point of the cost computation, namely, the start point of the trajectory to be matched is also shifted in accordance with the running of the vehicle so as to keep a trajectory length constant, and the threshold value for deciding the cost J*(i, j) is also kept at a constant value.

In the above way, the vehicular position can be compensated by optimally matching the whole trajectory to the road data, and the calculations for finding the optimal matching can be executed by the iterative processing of the DP conformed to the running of the vehicle. Although Eq. (14) has been indicated as an example of the matching cost formula on which the DP calculations are based, the present invention is not restricted to this equation.

In each of the calculating systems, the positional quantization units with which the probability or cost of the estimative vehicular position is computed are determined by the detection accuracies of the detection means and the quantization of the map data (and the processing speed of the calculation). Here, points on the two-dimensional space of the land surface are quantized in the "probability" system, while points on road segments are quantized in the "DP" system. Besides, positional quantization units in the case of presenting the estimated result of the vehicular position to the user by image display or any other means need not always agree with the quantization units for the computation.

The foregoing and other objects, advantages, manner of operation and novel features of the present invention will be understood from the following detailed description when read in connection with the accompanying drawings.

BRIEF DESCRIPTION OF THE DRAWINGS

FIG. 24(a) is a diagram for explaining DP matching, while

DETAILED DESCRIPTION OF THE PREFERRED EMBODIMENTS

Now, the embodiments of the present invention will be described with reference to the drawings.

Embodiment 1

Figure 1:
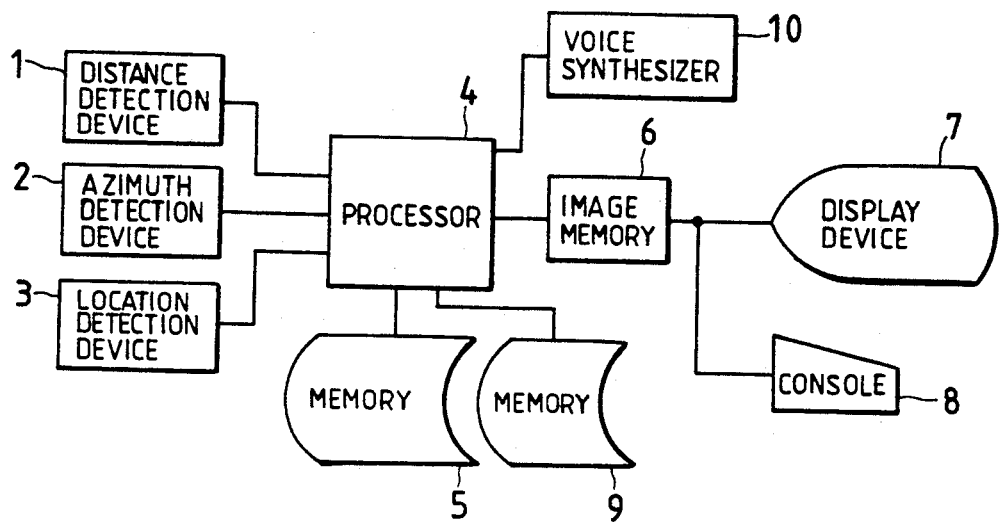
FIG. 1 is a general block diagram of an embodiment of an on-board navigation system according to the present invention.

FIG. 1 is a block diagram of the first embodiment of an on-board navigation system for a vehicle according to the present invention. A data processor 4 computes the probability density of a vehicular position every moment in accordance with a method to be described later, on the basis of running distance data which is the output of running distance detection means 1 for measuring the revolution number of a wheel or the like, vehicular azimuth data which is the output of vehicular azimuth detection means 2 for measuring a steering angle, a terrestrial magnetism or the like, and map data stored in a memory 5. The result of the computation is written into an image memory 6 and displayed on an image display device 7 together with the map data. The driver of the vehicle can know his position in a map from the display.

Figure 2:
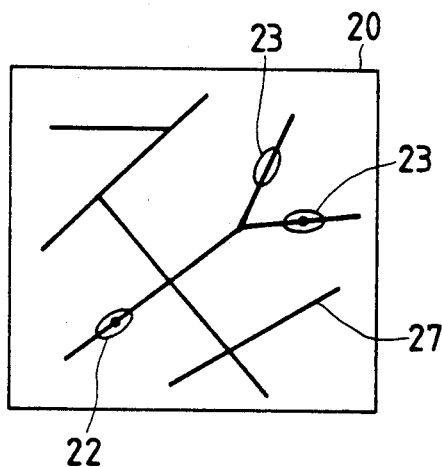
FIG. 2 is a diagram showing the display example of a map and a vehicular position.
Figure 3:
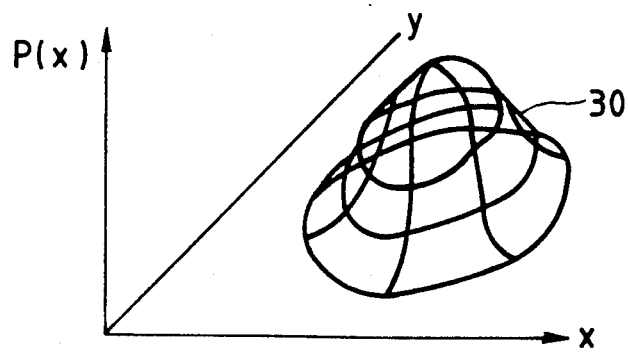
FIG. 3 is a diagram showing the probability density of the vehicular position.

FIG. 2 shows a display example on the display device 7. The map data, such as roads, 27 and vehicular position information 22 are displayed on a screen 20. The information is produced from the probability density 30 of the vehicular position as shown in FIG. 3. That is, the display in which the magnitudes of the probability densities of individual points (x, y) can be read is presented. By way of example, the points are displayed as brightnesses or in colors changed according to the magnitudes.

Figure 4:
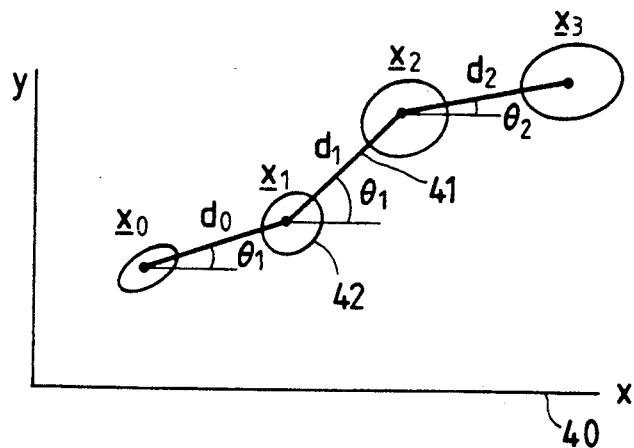
FIG. 4 is a diagram showing the geometrical relationship of a running route.

Next, there will be described the contents of the vehicular position estimation processing in the data processor 4. Let's consider a geometrical model as shown in FIG. 4. In a map coordinate system 40, the state of the vehicle is defined to be $x=(xy)^T$. The running distance $V_i$ and azimuth $\theta_i$ of the vehicle in each of time zones into which a period of time is divided at regular intervals, are respectively afforded by the detection means 1 and 2. On this occasion, a route 41 can be expressed by the following probability equation:

$$x_{i+1} = x_i + d_i \quad (17)$$

In addition, an observation equation becomes as follows:

$$y_i = d_i + G_i w_i$$

$$(i = 0, 1, \ldots) \quad (18)$$

where $$y_1 = \begin{pmatrix} V\cos\theta \\ V\sin\theta \end{pmatrix}_i$$

$$G_i = \begin{pmatrix} \cos\theta & -V\sin\theta \\ \sin\theta & V\cos\theta \end{pmatrix}_i$$

$$w_i = \begin{pmatrix} dV \\ d\theta \end{pmatrix}_i$$

Figure 5:
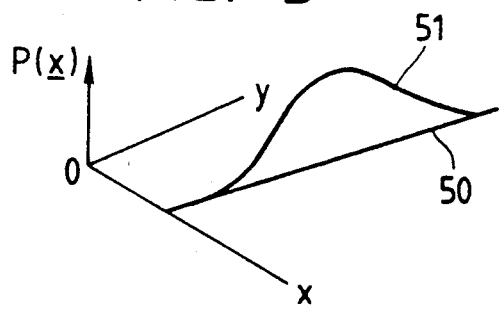
FIG. 5 is a diagram showing the initial value of the probability density in a driveway.
Figure 6:
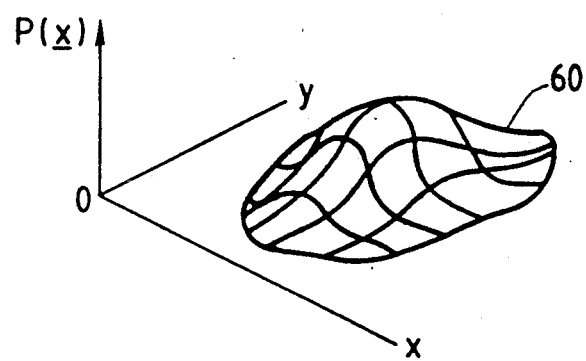
FIG. 6 is a diagram showing the initial value of the probability density in any other road.

Here, $w_i$ denotes the detection errors of the quantities $V_i$ and $\theta_i$, which can be regarded as white noise. When the probability density $p(x_0)$ of the initial value $x_0$ of the position of the vehicle at the start of the running of the vehicle or at the start of the vehicular position display is now given, the probability densities $p(x_i)$ of the subsequent states $x_i$ can be calculated from Eq. (17). The boundary line of $1\delta$ for $(i=1, \ldots)$ $p(x_i)$ becomes as indicated by a closed curve 42. Areas enclosed with the closed curves 42 increase with 'i' due to the disturbances $w_i$. That is, the vehicular position becomes indefinite gradually. Here, the probability density $p(x_0)$ can be given as stated below by way of example. By means of a console 8, the user indicates and inputs the current position of the vehicle judged by himself/herself within the map image which is displayed on the display device 7. The processor 4 evaluates $p(x_0)$ from the positional information. When the position of the indicative input lies on a road in the map display, $p(x_0)$ is given as a density distribution 51 centering around the indicated position on the road 50 as illustrated in FIG. 5. In contrast, when the indicative input position does not lie on a road in the map display, $p(x_0)$ is given as a density function 60 spreading on an (x, y)-plane around the indicated position as illustrated in FIG. 6. The density function is in the shape of for example, a Gaussian distribution. Besides, in a case where the shape of the density function of $x_0$ dependent upon the position in the map is known from the distributions of narrow streets, vacant lots, etc., it may well be given as $p(x_0)$. Such a functional shape may well be found by deciding the position, the kind of the road, etc. in the processor 4.

The estimation of the vehicular position using the map data conforms to the foregoing system in which the posterior conditional probability of Eq. (3) is maximized. Here, restrictive conditional probabilities $p(x_{i+1}|x_i)$ $(i=0, 1, \ldots)$ are given as stated below in accordance with the map data.

Figure 7:
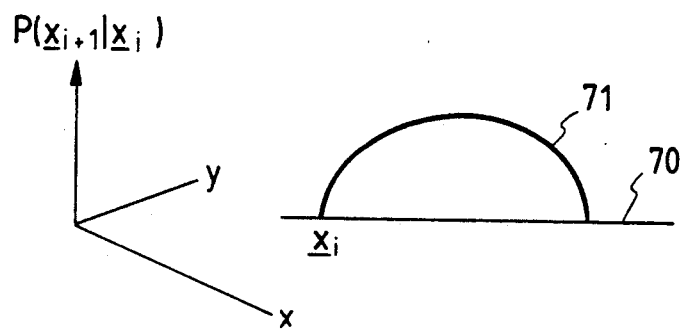
FIG. 7 is a diagram showing the conditioned probability density of the vehicular position on the driveway.
Figure 8:
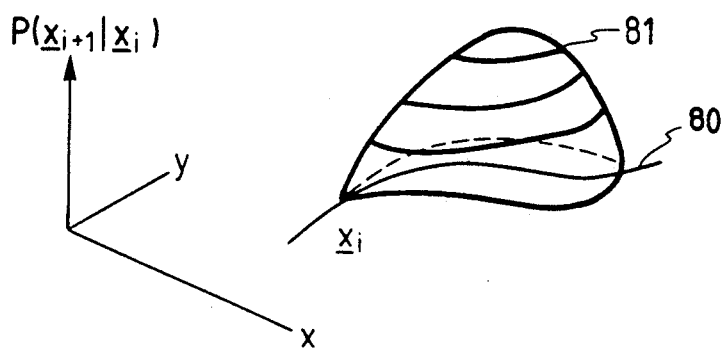
FIG. 8 is a diagram showing the conditioned probability density of the vehicular position in the presence of the possibility of running which misses a road.
Figure 9:
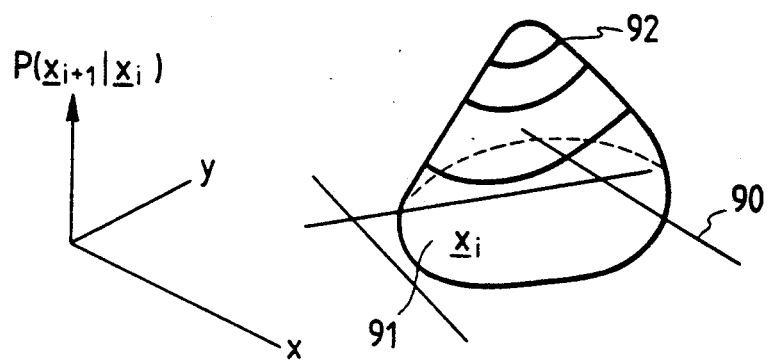
FIG. 9 is a diagram showing the conditioned probability density of the vehicular position which lies outside the road.
Figure 20:
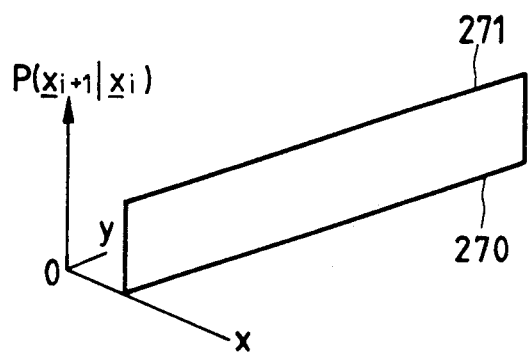
FIG. 20 is a diagram showing the probability density of a vehicular position in a driveway.
Figure 21:
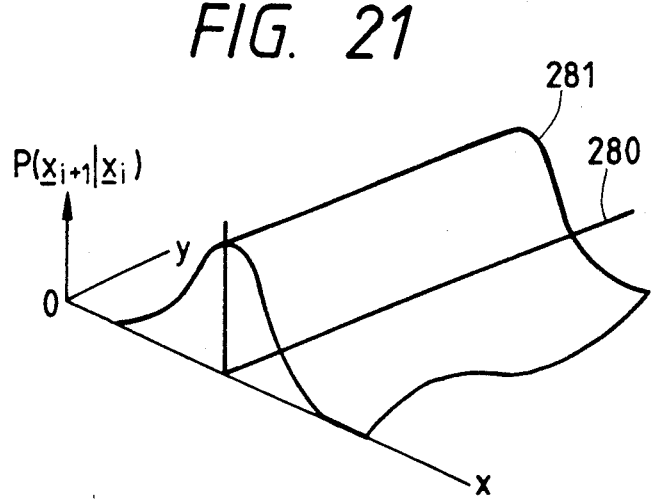
FIG. 21 is a diagram showing the probability density of the vehicular position in an urban district.

In a case where the current location $x_i$ lies on a section, such as a driveway (roadway), in which the vehicle does not go out of the road, the conditional probability $p(x_{i+1}|x_i)$ is afforded as a unidimensional conditional probability density 71 which is distributed on the road 70 in the map as shown in FIG. 7. In this case, a conditional probability $P(x_{x+1}|x_i)$ may well be afforded as a conditional probability density 271 which is uniformly distributed on a road 270 as shown in FIG. 20. On the other hand, in a case where the current location $x_i$ lies on the driveway, but where a service area or the like which is not contained in the road data of the map exists near the lower stream of the vehicular running, or in a case where the location $x_i$ lies on an urban street or the like and is a spot from which the vehicle can run out of roads in the map, the conditional probability $p(x_{i+1}|x_i)$ is afforded as a conditional probability density 81 which is distributed in two dimensions around the road 80 in the map as shown in FIG. 8. Further, in a case where the current location $x_i$ lies outside a road 90 in the map, namely, where it lies in the service area of the driveway, the narrow street of an urban district, a parking area, or the like, the conditional probability $p(x_{i+1}|x_i)$ is afforded as a two-dimensional conditional probability density 92 which is distributed in two dimensions near the current location $x_i$ 91 as shown in FIG. 9. The conditional probability $p(x_{i+1}|x_i)$ indicates the conditional probability density of a vehicular position $x_{i+1}$ which can be assumed at the next point of time with the position $x_i$ as a start point, and it can be evaluated from the possible lowest and highest speeds, a diversion probability at a branching point, etc. for each of the cases of the relationship between the road and the location $x_i$. Also in this case, a conditional probability $P(x_{i+1}|x_i)$ may well be afforded as a conditional probability density 281 which is distributed around a road 280 as shown in FIG. 21.

Further, a current vehicular speed may well be estimated from the output of a distance meter or a speedometer carried on the vehicle and be utilized.

Figure 10:
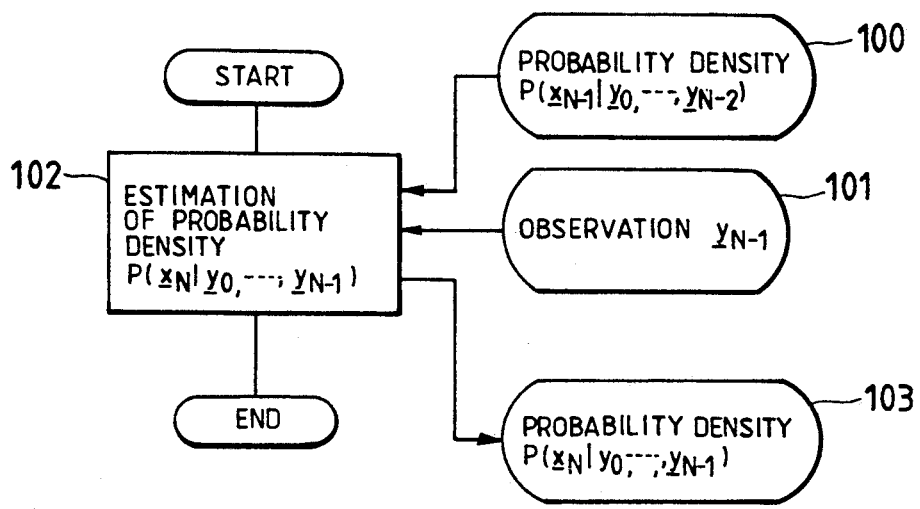
FIG. 10 is a diagram showing a procedure for estimating the probability density of the vehicular position.

Now, there are evaluated the time series $x_1, \ldots$ and $x_N$ of the states which maximize the posterior conditional probability of Eq. (3) for the given state equation (17), observation equation (18), initial probability density $p(x_0)$ and observation data $y_i$ ($i=0, \ldots,$ and $N-1$). First, for $N=1$, conditional probability densities $p(x_1|y_0)$ are found for all values which can be taken as $x_1$, in accordance with Eq. (5). The state $x_1$ which takes the maximum value of the conditional probability densities corresponds to the most probable location of the vehicle at this point of time. The conditional probability density $p(x_1|y_0)$ is stored in a memory 9 in FIG. 1 so as to be utilized at the next point of time, and it is also sent to the memory 6 so as to be displayed. At the point of time of or after $N=2$, as illustrated in FIG. 10, the posterior probability $p(x_{N-1}|y_0, \ldots, y_{N-2})$ 100 evaluated at the preceding point of time is read out of the memory 9, and conditional probability densities $p(x_{N-1}|y_0, \ldots, y_{N-1})$ are obtained for all values which $x_N$ can take, in accordance with Eq. (4) and by the use of an observation $y_{N-1}$ 101, the obtained result being written into the memory 9 (103) and being sent to the memory 6 so as to be displayed.

Figure 11:
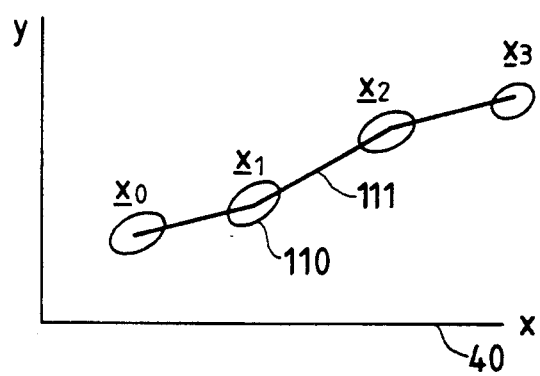
FIG. 11 is a diagram showing an estimated running route.

The boundary line of 1δ for the obtained posterior conditional probabilities becomes as indicated at numeral 110 in FIG. 11, and an area enclosed with the curve 110 becomes smaller than in the case of the curve 42 in FIG. 4. This signifies decrease in the error of the estimation.

Thus, the vehicular position at the current time can be read together with the reliability thereof. The point at which the conditional probability becomes the maximum is the expected value of the current position. In a case where a road diverges in FIG. 2 and where significant posterior conditional probability values exist on two or more roads, all the values may be displayed as indicated at numeral 23.

Here, the computations need to be performed for all the continuous values $x_N$ which can take the posterior conditional probability $p(x_N|y_0, \ldots, y_{N-1})$. In the actual processing, however, they may be performed for points obtained by sampling the map coordinates at suitable intervals.

On this occasion, the integral calculations of Eqs. (4) and (5) become the sums of products.

Incidentally, the value of $p(y_i)$ ($i=0, \ldots,$ and $N-1$) may be found so that the integration of $p(x_N|y_0, \ldots, y_{N-1})$ with respect to $x_N$ may become one.

Embodiment 2

Figure 12:
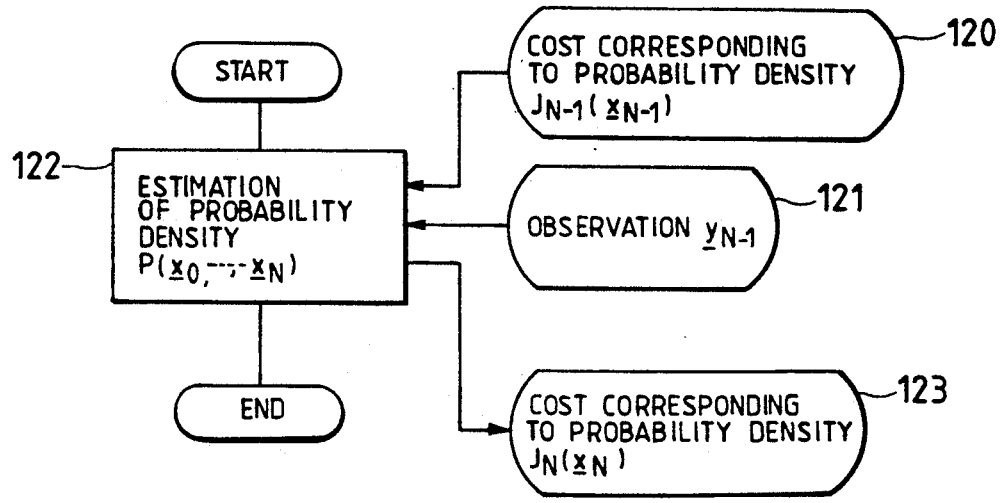
FIG. 12 is a diagram showing a procedure for estimating the probability density of the vehicular position in another embodiment.

The second embodiment consists in substituting the processing contents of the processor 4 which constitutes the first embodiment of the navigation system carried on the vehicle. Here, similarly to the foregoing, the initial probability density $p(x_0)$ and the conditional probability density $p(x_{i+1}|x_i)$ $i=0, \ldots,$ and $N-1$) are given beforehand. The processor 4 executes the following processing as indicated in FIG. 12:

There are evaluated the series $x_0, x_1, \ldots$ and $x_N$ of the states which maximize the posterior conditional probability of Eq. (6) for the given state equation (17), observation equation (18), initial probability density $p(x_0)$ and observation data $y_i$ ($i=0, \ldots,$ and $N-1$). First, for $N=1$, $J_1(x_1)$ is found for all values which can be taken as $x_1$, in accordance with Eq. (11). $J_1(x_1)$ corresponding to the maximum value of the posterior conditional probability density $p(x_0, (x_1|y_0)$ obtained when $x_1$ is given, is stored in the memory 9 so as to be utilized at the next point of time. The conditional probability density $p(x_0,x_1|y_0)$ is sent to the memory 6 so as to be displayed. At the point of time of or after $N=2$, as illustrated in FIG. 12, a cost $J_{N-1}(x_{N-1})$ 120 which corresponds to the maximum value of the following posterior conditional probability obtained when $x_{N-1}$ evaluated at the preceding point of time is read out of the memory 9:

$$p(x_0, x_1, \ldots, x_{N-1}|y_0, \ldots, y_{N-2})$$

$C(x_N, x_{N-1})$ is obtained for all values which $x_N$ can take, in accordance with Eq. (8) and by the use of an observation $y_{N-1}$ 121, and $J_N(x_N)$ 123 is evaluated from the two in accordance with Eq. (10) and is written into the memory 9 (122). $J_N(x_N)$ is the maximum value of the following posterior conditional probability obtained when $x_N$ is given:

$$p(x_0, x_1, \ldots, x_N|y_0, y_{N-1})$$

It is sent to the memory 6 so as to be displayed. The display may be presented by the same method as in the first embodiment.

The posterior conditional probability displayed at each point of time:

$$p(x_0, x_1, \ldots, x_N|y_0, \ldots, y_{N-1})$$

indicates the posterior conditional probability in the case where the optimum route is taken in the sense of the maximum posterior conditional probability with the noticed state $x_N$ as a terminal end. If a vehicular route 111 in the past is to be known, processing as described below may be executed in the processor 4. Eq. (10) is solved in the descending series of N on the basis of the state $x_N$ at the given terminal end point, whereby the states $x_N$ of the optimum routes are obtained in the descending series of N. On this occasion, the values $d_N$ and $\theta_N$ in the past are required. For this purpose, the outputs of the detection means 1 and 2 may be stored in the memory 9 beforehand so as to read them out at need.

Here, $J_N(x_N)$ may be computed for respective points obtained by sampling all the values of $x_N$ which can be taken. In addition, a proper fixed value may be given as $p(y_i)$ ($i=0, \ldots,$ and $N-1$). The posterior conditional probability obtained on this occasion has a value thus subjected to scaling.

Embodiment 3

Next, there will be described an embodiment in which a plurality of sorts of devices are disposed as either or each of the running distance detection means 1 and the vehicular azimuth detection means 2, thereby to relieve the influence of the error of the detection data being the output of the detection means and to heighten the estimation accuracy of the current position of the vehicle. The running distance detection means to be added here is, for example, an inertial navigation system. Besides, the vehicular azimuth detection means is means for measuring the difference between the rotational angles of both the right and left wheels, the azimuth of the sun or a specified celestial body, or the like. On this occasion, the processing of the processor 4 may be changed as stated below: Now, letting $V_i'$ denote the running distance of the vehicle as measured in the i-th time zone by the additional detection means, and $\theta_i'$ denote the vehicular azimuth, the following is obtained as an observation equation in addition to Eq. (18):

$$y_i' = d_i + G_i' w_i \qquad (18')$$

where $$y_i' = \begin{pmatrix} V\cos\theta' \\ V\sin\theta' \end{pmatrix}$$

$$G_i' = \begin{pmatrix} \cos\theta' & -V\sin\theta' \\ \sin\theta' & V\cos\theta' \end{pmatrix}$$

$$w_i' = \begin{pmatrix} dV \\ d\theta' \end{pmatrix}$$

On this occasion, the observation vector $y_i$ based on Eq. (18) and the observation vector $y_i'$ mentioned above are combined to prepare a new 4-dimensional observation vector:

$$Y_i = \begin{pmatrix} y_i \\ y_i' \end{pmatrix} \qquad (19)$$

whereupon the estimative value of the current position $x_i$ which maximizes the posterior conditional probability of Eq. (3) or Eq. (6) may be found by replacing the observation vector $y_i$ of Eq. (2) with the new observation vector. Herein, the procedure of the processing is similar to that in the first or second embodiment. However, the number of the dimensions of the observation vector increases. Besides, in a case where an observation vector $y_i''$ based on the third detection means is obtained, the following 6-dimensional observation vector may be employed:

$$Y_i = \begin{pmatrix} y_i \\ y_i' \\ y_i'' \end{pmatrix} \qquad (20)$$

The same applies in cases of observation vectors of more increased dimensions. Here, in the case where the plurality of detection means are disposed, the abnormality of detection data can be sensed as described below: First, in case of the detection means, such as terrestrial magnetism azimuth sensor, which is greatly affected by a disturbance, the output thereof is compared with that of a sensor of high reliability such as gyro, and when the difference between both the outputs is larger than a predetermined threshold value, the output of the terrestrial magnetism azimuth sensor is regarded as being abnormal. Besides, in case of providing at least three sensors, the outputs of the respective sensors are compared, and when one output differs from the two others in excess of a predetermined threshold value, it is regarded as being abnormal.

Embodiment 4

Next, there will be described the fourth embodiment in which means 3 for detecting information on the current position of the vehicle is provided in addition to the detection means 1 and 2. Such means includes the GPS and the radio beacons of sign posts, loran etc. A measure in which a flying machine maintained at a high altitude so as to be used as the radio beacon, and a measure in which the inclination of the body of the vehicle is detected on the basis of the suspension of the wheels or the load of the engine of the vehicle as stated later, correspond also to this means. Herein, the processing of the processor 4 may be changed as follows: According to the detector 3, an observation equation (21) may be formularized:

$$z_i = h_i(x_i) + v_i (i = 1, 2, \ldots) \qquad (21)$$

Here, z denotes an observation vector of m-th order, h an m-th order vector function, and v a white noise vector of m-th order, the probability density p(v) of which is assumed to be given.

On this occasion, as to the first embodiment, the observation of Eq. (21) is added instead of Eq. (3), and the following posterior conditional probability is maximized:

$$P(x_N | y_0 \ldots Y_{n-1}, z_1, \ldots, z_N) \qquad (22)$$

Processing required for obtaining the solution of this problem becomes quite the same as in the foregoing when Eq. (4) is put as:

$$p(x_N | y_0, \ldots, y_{N-1}, z_1, \ldots, z_N) = \int p(y_{N-1} | x_{N-1}, x_N) \cdot \qquad (4)'$$
$$p(z_N | x_N) \cdot p(x_N | x_{N-1}) / p(y_{N-1}) / p(z_N) \cdot$$
$$p(x_{N-1} | y_0, \ldots, y_{N-2} z_1, \ldots, z_{N-1}) \cdot dx_{N-1}$$

or Eq. (5) is put as:

$$p(x_1 | y_0, z_1) = \int p(y_0 | x_0, x_1) \cdot p(z_N | x_N) \cdot \qquad (5)'$$
$$p(x_1 | x_0) / p(y_0) / p(z_1) \cdot p(x_0) dx_0$$

As to the second embodiment, the observation of Eq. (21) is added instead of Eq. (8), and the following posterior conditional probability is maximized:

$$P(x_0 x_1, \ldots, x_N | y_0, \ldots, y_{N-1}, z_1, \ldots, z_N) \qquad (23)$$

Processing required for obtaining the solution of this problem becomes quite the same as in the foregoing when the following is put in Eq. (8):

$$\frac{d}{dx} l_N = p(x_0, x_1, \ldots, x_N | y_0, \ldots, y_{N-1}, z_1, \ldots, z_N)$$
$$C(x_N, x_{N-1}) = p(y_{N-1} | x_{N-1}, x_N) \cdot$$
$$p(x_N | x_{N-1}) / p(y_{N-1}) \times p(z_N | x_N) / p(z_N)$$

By the way, in the case where the detection means 3 detects the inclination of the vehicular body, the output of the detector is $z_i$ in Eq. (21). In addition, $h_i(x_i)$ denotes the inclination of the road surface of the spot $x_i$, and it may be included in the map data and stored in the memory 5. Besides, in a case where a plurality of position detection means are comprised, an observation vector $Z_i$ of large dimensions in which the outputs of the means are arrayed is substituted for $z_i$, and the subsequent handling does not differ at all. Further, in the case of employing the vehicular position detection means 3 as stated above, the output thereof may be used for obtaining the probability density $p(x_0)$ of the initial vehicular position in accordance with Eq. (21).

Embodiment 5

Next, there will be described the embodiment of processing which is executed for the abnormal detector data or map data in the processor 4. In the first embodiment, $$\int\int p(y_{N-1}, x_{N-1}, \ldots, x_N) \cdot p(x_N | x_{N-1}) \cdot p(x_{N-1}, y_0, \ldots, y_{N-2}) \cdot dx_{N-1} \cdot dx_N \quad (24)$$

is computed. From Eq. (4), it is transformed into:

$$\int p(x_N | y_0, \ldots, y_{N-1}) \cdot p(y_{N-1}) d x_N = p(y_{N-1}) \quad (25)$$

Accordingly, when the value of Eq. (24) is smaller than a predetermined threshold value, it can be decided that detector data $y_{N-1}$ or map data $p(x_N|x_{N-1})$ has been abnormal. When the abnormality has been sensed, it is displayed on the display device 7 by way of example, so as to inform the user to that effect and to urge the user to input the current position information $p(x_0)$ from the console 8. Then, the vehicular position estimation processing is reset, and it is changed-over to an estimation from the spot $x_0$. In the presence of a plurality of detection means, an estimation may well be tried again by the use of the output data of the detection means other than ones decided abnormal.

Further, as regards the estimated result $p(x_N|y_0, \ldots, y_{N-1})$, the maximum value for the spot $x_N$ is detected. Thus, when the detected value is smaller than a predetermined threshold value, it can be decided whether the sensor detection data $y_{N-1}$ or the map data $p(x_N|x_{N-1})$ has been abnormal, or in spite of the data being normal, the vehicular position has been lost because the running route pattern of the vehicle has no feature. Also in this case, the user may well be informed to that effect so as to reset the vehicular position estimation.

Besides, in the case where the vehicular position detection means 3 is provided, an abnormality can be sensed in the following way: The conditional probability density $p(x_i|z_i)$ of the position $x_i$ is evaluated from the output $z_i$ of the detector 3 in accordance with Eq. (21). On the other hand, the conditional probability density $p(x_i|y_0, \ldots, y_{i-1})$ of the position $x_i$ is evaluated without using the output of the detector 3, by the method of the first embodiment. In the absence of a region of $x_i$ where both the probability densities simultaneously take significant values greater than a predetermined threshold value, the latter density is regarded as being abnormal, and the position estimation from the current time is started anew with the former density being $p(x_0)$.

Embodiment 6

Next, there will be described an embodiment in the case where the running of the vehicle is limited onto roads in the map data. This is applied to a navigation system which handles only driveways, or a navigation system with which the user receives service, consenting to the running on the roads in the map. In this case, the conditional probability $p(x_{i+1}|x_i)$ of the vehicular position for use in the processing of the data processor 4 may be set so as to become zero when either $x_i$ or $y_{i+1}$ does not lie on the road in the map. That is, it is given as indicated at numeral 71 in FIG. 7. In general, Embodiments 1 and 2 give the conditional probability $p(x_{i+1}|x_i)$ as a two-dimensional distribution. In contrast, when the user has instructed from the console 8 to the effect that the drive limited onto the roads as stated above is to be performed, the conditional probability $p(x_{i+1}|x_i)$ may be changedover to the unidimensional distribution as mentioned above and be utilized.

Figure 13:
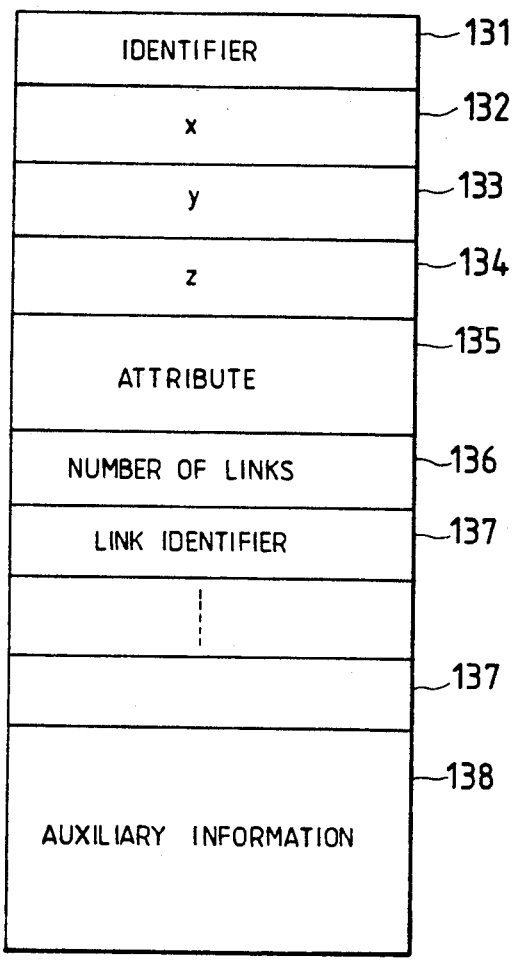
FIG. 13 is a diagram showing the format of node data in map data.
Figure 14:
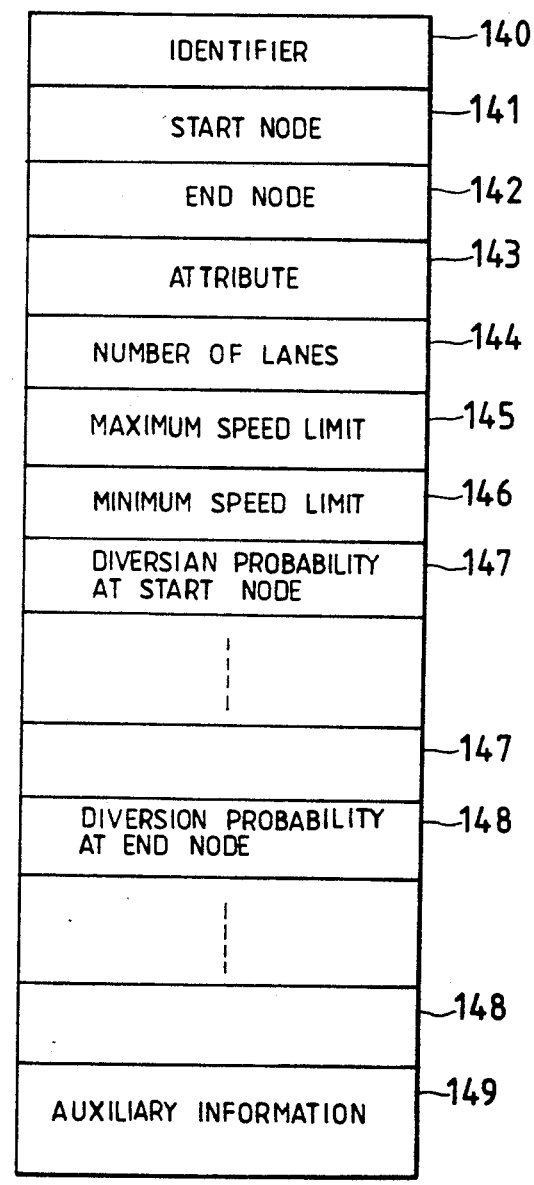
FIG. 14 is a diagram showing the format of link data in the map data.

Here will be described the formats of the map data for use in the navigation system of the present invention and methods of utilizing the map data. Roads contained in the map data are expressed by nodes such as intersection points, branching points and bending points, and the links between the nodes as approximated by straight lines or circular arcs. As indicated in FIG. 13, the data format of the node consists of an identifier 131, an x-coordinate 132, y-coordinate 133 and z-coordinate 134 in a map coordinate system, an attribute 135, the number of connected links 136, link identifiers 137 in the number of the links, and other auxiliary information 138. As the attribute 135, besides the identifier of the intersection point, branching point or bending point, the user may well additionally write a service area, parking area, gasoline station or the like which is useful for the user to recognize the vehicular position or route. On the other hand, as indicated in FIG. 14, the data format of the link consists of an identifier 140, a start node identifier 141, an end node identifier 142, an attribute 143, the number of lanes 144, a maximum speed limit 145, a minimum speed limit 146, the diversion probabilities of traffic flow 147 at the start node, the diversion probabilities of traffic flow 148 at the end node, and other auxiliary information 149. The user may well additionally write the identifier of a driveway, urban street, suburban street or the like as the attribute 143, and regulation information etc. and other items convenient for the user as the auxiliary information 149. Incidentally, when the up and down directions of a road need not be distinguished, the start point and end point are changed to read as terminal points. In addition, the prior information items of measurement errors dependent upon places, such as the disturbances of a terrestrial magnetic sensor attributed to a railway, a high level road etc., may well be written in the auxiliary information 138 or 149 in terms of, for example, the values of biases or error covariances. Besides, as to sign posts, the error covariances thereof may well be stored in the auxiliary information 138. These map data items are stored in the memory 5. Here, fixed information items among the map data are stored in a read-only memory such as CD-ROM, while additional or variable information items are stored in a rewritable memory such as RAM. Alternatively, both the fixed and variable information items may be stored in an optomagnetic disk, a bubble memory or the like which is rewritable. The map data is utilized as follows by the processor 4:

(1) Using the data items of the coordinates and connective relations of nodes and links, a road map in the neighborhood of the current position of the vehicle is displayed on the display device 7. The links may well be selected or distinguished in colors in accordance with the attributes thereof. Besides, the attributes of the nodes serving as marks may well be displayed.

(2) There is evaluated the conditional probability density $p(x_{i+1}|x_i)$ of the position $x_{i+1}$ of the vehicle at the next point of time in the case where the current vehicular position $x_i$ has been given. As referred to in the description of the first embodiment, in a case where $x_i$ lies on or near a link, $p(x_{i+1}|x_i)$ is evaluated by the use of the attribute of the link and the maximum and minimum speed limits thereof. Further, in a case where $x_i$ lies on or near a node, $p(x_{i+1}|x_i)$ is evaluated by the use of the attribute, diversion probability etc. of the node. Here, the values 147 and 148 in the memory 5 may well be used as the diversion probabilities. However, when the vehicle is navigated along a route leading to a predetermined destination, different values may well be used as described below.

(3) The optimum route from a given start point or current position to the destination is calculated according to the connective relations of nodes and links, the distances of the links, speed limits, etc. The calculated route is overlay-displayed on a map by the display device 7, and the selections of courses at the respective nodes are displayed. On this occasion, the probabilities of diversions to the courses are made greater than the values stored in the map data, whereupon $p(x_{i+1}|x_i)$ is calculated in conformity with the procedure (2).

(4) In a case where a sensor for detecting the inclination of a vehicular body is comprised as the sensor 3, the inclination of a noticed link is evaluated from the z-coordinate values of both the end nodes of the link and the distance of the link, and it is checked up with the sensor output by the foregoing method so as to be utilized for the estimation of a vehicular position.

(5) In a case where a sign post is employed as the sensor 3, the installation location and error covariance value thereof can be read out from the memory of the map data so as to be utilized for the estimation of a vehicular position.

(6) In a case where the vehicular azimuth detection means 2 is one, such as a terrestrial magnetism sensor, which undergoes different disturbances depending upon places, the prior information items of errors, namely, biases, covariances etc. can be read out from the map data memory so as to be utilized for the estimation of a vehicular position.

(7) The data items of nodes and links are retrieved using an estimated vehicular position as an index, and the identifiers, attributes, auxiliary information items etc. of the neighboring node and link are displayed and communicated to the user.

Embodiment 7

Figure 15:
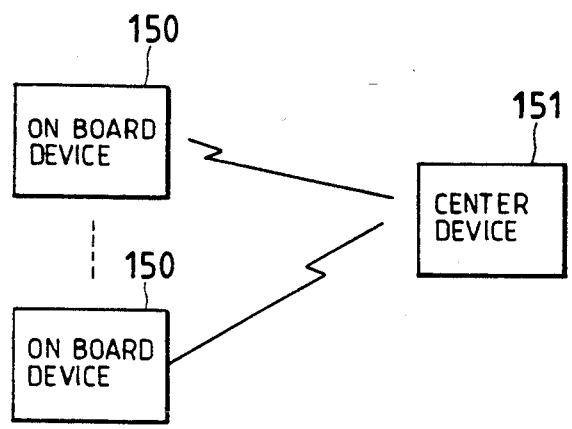
FIG. 15 is a general block diagram of an embodiment of a vehicular location system according to the present invention.
Figure 16:
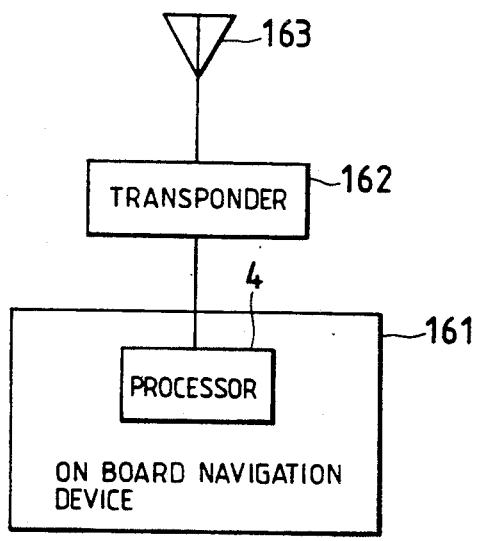
FIG. 16 is a block diagram of on-board devices.
Figure 17:
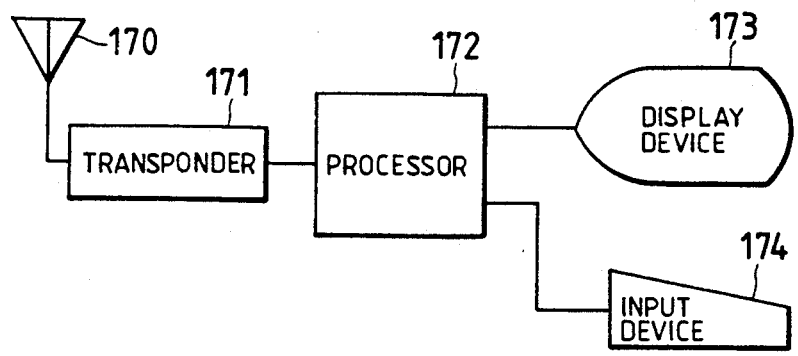
FIG. 17 is a block diagram of a center device.

Next, the first embodiment of a location system which adopts the vehicular position estimating system according to the present invention will be described with reference to FIGS. 15-17. FIG. 15 is a general block diagram of the location system. This system is constructed of at least one on-board device 150 carried on a vehicle, and a single center device 151. Data items are transferred between both the devices by radio communication. FIG. 16 is a block diagram of the device 150. An on-board navigation system 161 is equivalent to that shown in FIG. 1. The estimated result of a vehicular position produced from a processor 4 in the system 161 is sent to the center device 151 through a transponder 162 as well as an antenna 163, together with the identifier of the vehicle. On the other hand, a command etc. sent from the center device 151 are utilized for display etc. by the processor 4 through the antenna 163 as well as the transponder 162. FIG. 17 is a block diagram of the device 151. The identifier of each vehicle and the estimated result of the position thereof as sent from the on-board device 150 are sent to a processor 172 through an antenna 170 as well as a transponder 171, and they are displayed on a display device 173 or are utilized for processing for the service management of the vehicle. A command etc. for the vehicle, which are given from an input device 174 by a service manager or prepared by the processor 172, are sent toward the vehicle through the transponder 171 as well as the antenna 170, together with the identifier of the vehicle.

Embodiment 8

Figure 18:
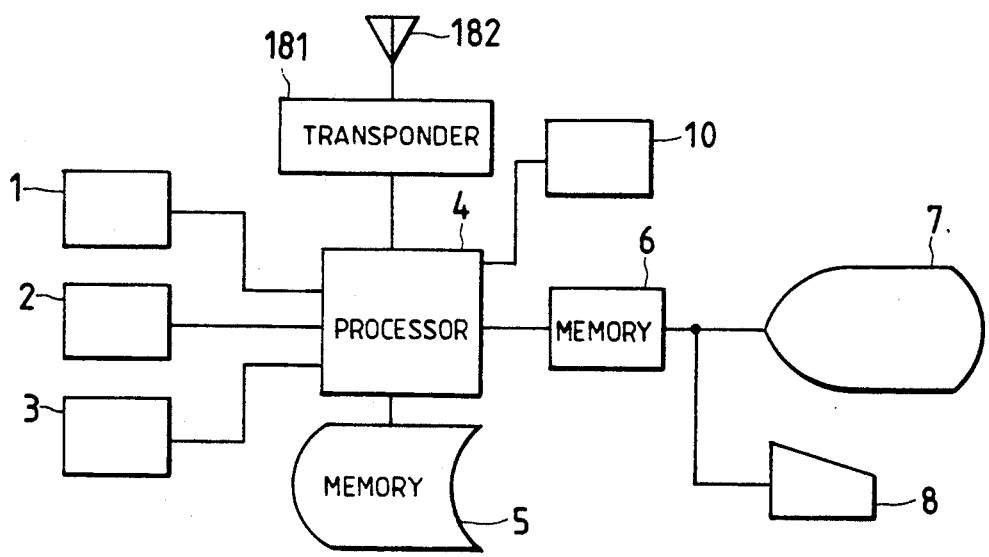
FIG. 18 is a block diagram of on-board devices in another embodiment of the vehicular location system.
Figure 19:
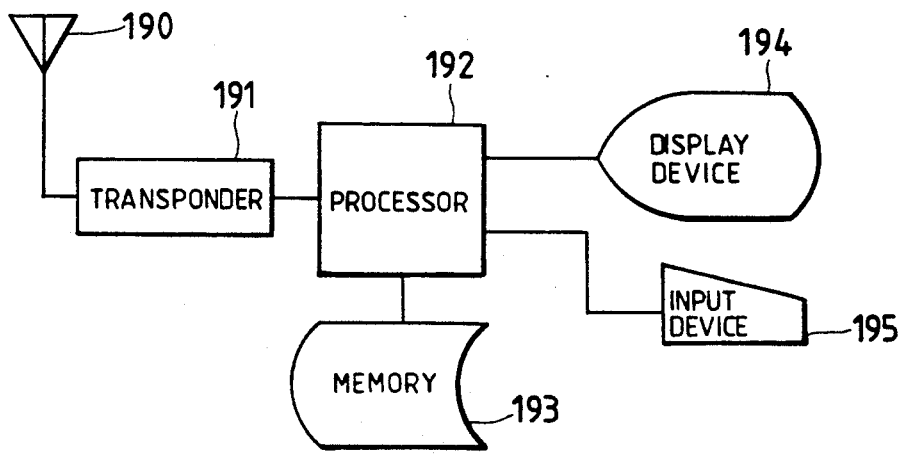
FIG. 19 is a block diagram of a center device in the second embodiment.

Next, the second embodiment of the location system will be described with reference to FIGS. 18 and 19. The general arrangement of this system is the same as shown in FIG. 15. FIG. 18 is a block diagram of the on-board device 150. The outputs of detection means 1 thru 3 are sent to the center device 151 through a processor 4, a transponder 181 and an antenna 182 every fixed time, together with the identifier of the vehicle. On the basis of the received sensor outputs and map data, the center device 151 executes processing to be described below and estimates the position of the vehicle. The result is sent to the vehicle together with a command, and it is displayed on a device 7 through the antenna 182, the transponder 181, the processor 4 and a memory 6 so as to be communicated to the user of the system. On this occasion, map data stored in a memory 5 may well be overlay-displayed. FIG. 19 is a block diagram of the center device 151. The identifier and sensor outputs of each vehicle, which are sent from the on-board device 150, are delivered to a processor 192 through an antenna 190 as well as a transponder 191. The processor 192 executes the same processing as that of the processor 4 in Embodiment 1 or 2, and estimates the position of the vehicle. Herein, a memory 193 which stores the map data and an estimated result at the last sampling point of time and which corresponds to the memories 5 and 9 is utilized. The estimated result is displayed on a display device 194, or is utilized for processing for the service management of the vehicle. A command etc. for the vehicle, which are given from an input device 195 by a service manager or prepared by the processor 192, are sent toward the vehicle through the transponder 191 as well as the antenna 190, together with the positional estimation result and the identifier of the vehicle. As compared with the foregoing embodiments, this embodiment has the following features:

(1) The load of the on-board processor 4 is lower, and the size thereof can be reduced.

(2) The on-board memory 9 is dispensed with, and the map data in the memory 5 may contain only the attributes, connective relations etc. of nodes and links, so the size thereof can be reduced.

(3) The memory 5 is also dispensed with when a system in which the center device 151 prepares map image data for display and transmits it to the on-board device 150 is adopted.

(4) In the case where the position measurement device based on the GPS is employed as the detection means 3, this means 3 can be miniaturized by adopting a system in which a signal received from a satellite is sent to the center device 151 so as to execute the position calculation processing therein, instead of the on-board processing for calculating the position from the received signal. In consequence, this embodiment can simplify and miniaturize the on-board devices. It is also a modification to the navigation system.

In the navigation system of the present invention, the vehicular position estimated every moment may well be stored in the memory 9 together with the codes of a start point and a destination applied from the exterior 8. In that case, when the vehicle runs between the identical start point and destination after such running, a corresponding route can be guided to the driver in such a way that running spots on the route are read out from the memory 9 and displayed on the display device 7 in accordance with the codes of the start point and destination applied from the exterior 8. Here, $x_N$ (N=0, 1, ...) maximizing Eq. (4), Eq. (12) or Eq. (13) can be used as the vehicular positions to be stored in the memory 9.

Although, in each of the foregoing embodiments, the display device 7 has been employed as the means for communicating the estimated result of the current position of the vehicle to the user, it may well be replaced with a voice synthesizer 10 (in FIG. 1). The sentences of, for example, "You are approaching Intersection —" and "You are near—" are synthesized and communicated as voice in accordance with the probability densities of the estimated results and the coordinates of the nodes and links in the map data. This expedient produces the effect that, when the user is the driver, the burden of seeing the display during running can be avoided.

According to the embodiments thus far described, the current position of a vehicle is estimated using map data, and hence, there is the effect that the divergence of an estimation error ascribable to the error of other detector data is suppressed.

Moreover, since the probability density of the vehicular position is displayed on a map, there is the effect that the user can know the reliability of an estimated result and prevent a confusion ascribable to an erroneous display.

Furthermore, since the estimation system of the present invention can collectively handle various kinds of detector data, there is the effect that the achievement of a high accuracy is facilitated by combining the system with the detector of a GPS or the like.

Embodiment 9

Figure 23:
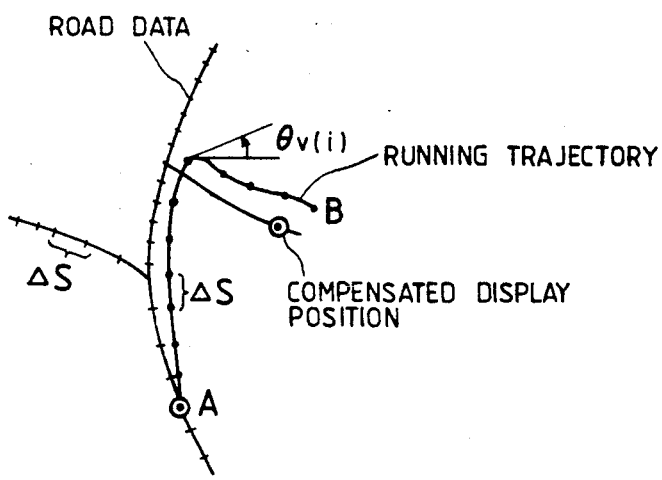
FIG. 23 is a diagram for explaining map data and a trajectory.
Figure 22:
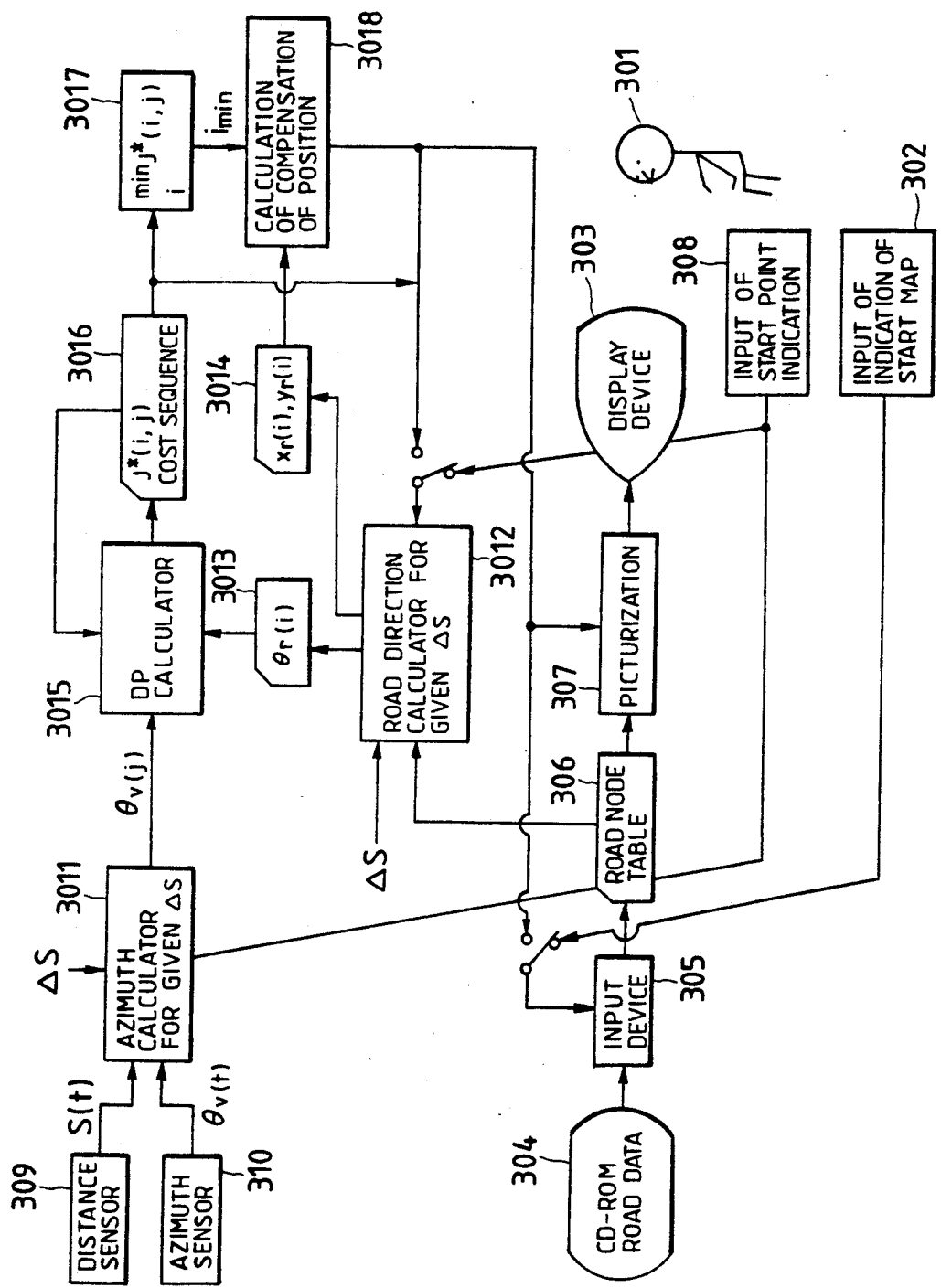
FIG. 22 is a block diagram of an embodiment of an on-board navigation system according to the present invention.
Figure 24A:
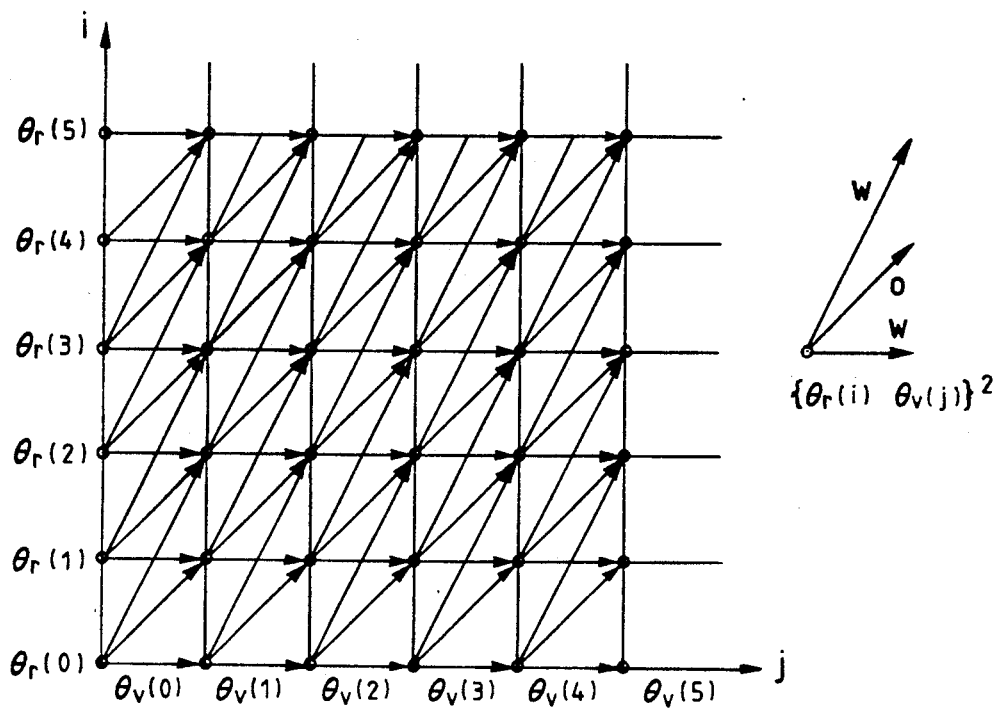
Figure 24B:
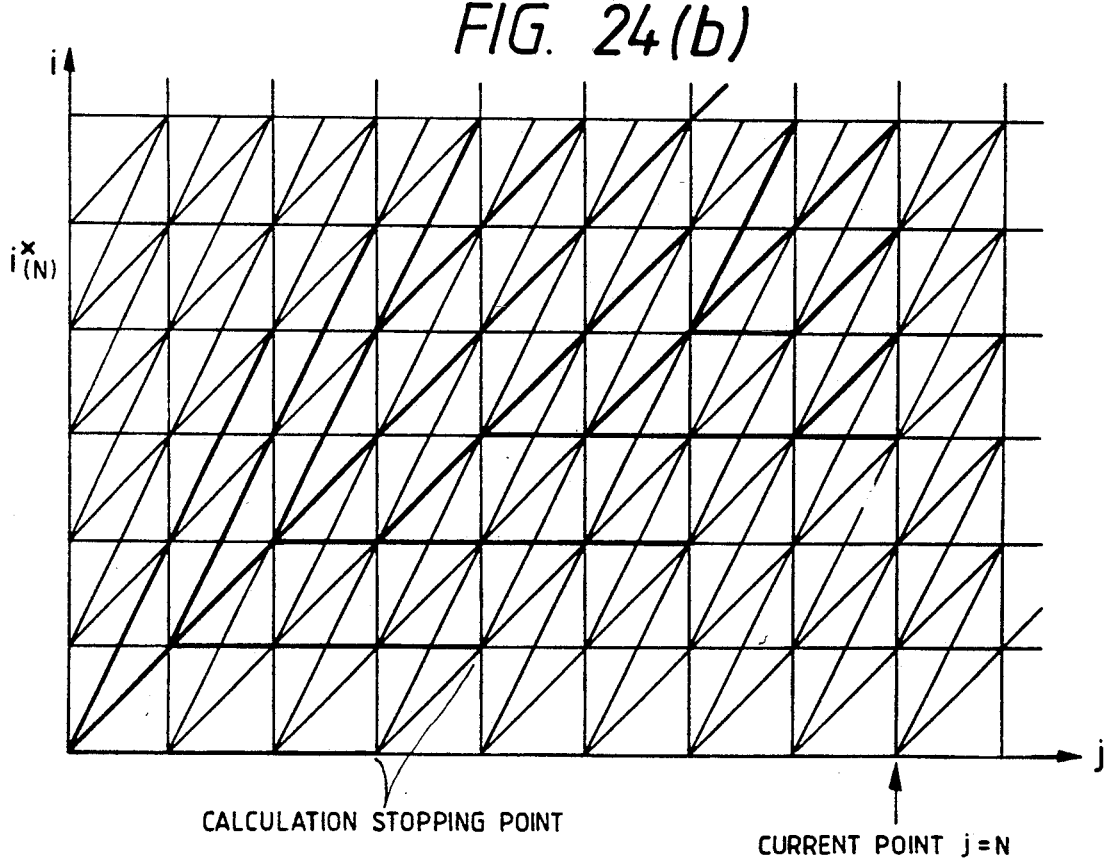
FIG. 24(b) is a diagram for explaining the stop of DP calculations as based on the check of a matching cost.
Figures 25A, 25B:
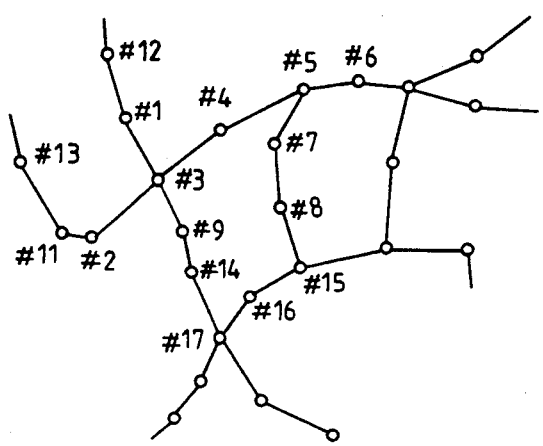
FIGS. 25(a) and 25(b) are diagrams showing map data and the table format thereof, respectively.

FIG. 22 shows an on-board navigation system which adopts the present invention. In beginning the use of the navigation system, a driver (or another occupant) 301 designates a road map including a current position, from a device 302 for inputting the indication of a start map. Then, road data on a CD-ROM 304 is read out by an input device 305 and displayed on an image display device 303. The road data is once stored in a road node table 306 and is converted by picturization means 307 into bit map data, which is sent to the image display device 303. The road data is expressed by the node table which is exemplified in FIGS. 25(a) and 25(b). The picturization means 307 evaluates the formulae of straight lines between adjacent nodes for all the nodes, and alters pixel values on the straight lines from background density (color) values into road density (color) values in a write image buffer. When the road image as shown in FIG. 25(a) is displayed on the image display device 303, the driver 301 inputs the current position of a vehicle with a device 308 for inputting the indication of a start point, which is constructed of a cursor moving device, while viewing the display of a cursor on the image display device 303. In conformity with this timing, an azimuth calculator 3011 for $\Delta S$ intervals begins to receive a running distance S(t) and a vehicular azimuth $\theta_y(t)$ from a distance sensor 309 and an azimuth sensor 310 constructed of a terrestrial magnetism sensor, respectively, and it delivers running directions $\theta_y(j)$ (j=0, 1, ...) of the respective fixed distances $\Delta S$ in succession. Simultaneously with the input of the indication of the start point, the coordinates of the start point on the image are applied to a road direction calculator 3012 for the $\Delta S$ intervals. The road direction calculator 3012 first finds a point on the road data nearest the start point coordinates as received by loading the road node table 306, and sets it as the coordinates A of the new start point. Subsequently, the calculator 3012 evaluates the road direction data $\theta_r(i)$ of points at the respective fixed distances $\Delta S$, for all road routes which can be reached from the point A, and it sends the evaluated data to a road direction data file 3013. The number of the road direction data items, namely, the size of the file is set to be double the maximum trajectory length M of DP matching. At the same time, the road direction calculator 3012 supplies a road coordinate data file 3014 with the coordinates $\{x_r(i), y_r(i)\}$ of the points at the intervals $\Delta S$. When a DP calculator 3015 is supplied with the vehicular direction data $\theta_y(0)$ and $\theta_y(1)$ from the azimuth calculator 3011 for the $\Delta S$ intervals with the proceeding of the vehicle, the minimum costs of three lattice points (0, 1), (1, 1) and (2, 1) in FIG. 24(a) are computed according to Eq. (16) and are delivered to a minimum cost file 3016. When the vehicle proceeds to pass the point of j=2, $\theta_y(2)$ is delivered from the azimuth calculator 3011. Then, the DP calculator 3015 reads out the minimum cost values $J^*(0, 1)$, $J^*(1, 1)$ and $J^*(2, 1)$ stored at the last time, from the minimum cost file 3016, and it calculates the minimum cost values $J^*(i, 2)$ (i=1, ... and 4) at j=2 in accordance with Eq. (16) by the use of the road direction angles $\theta_r(i)$ (i=0, 1, 2, 3 and 4) received from the road direction data file 3013, the calculated results being stored in the minimum cost file 3016. As stated before, the DP calculator 3015 executes the final stage of the DP matching calculation between the trajectory and the route of the road data in conformity with the running of the vehicle. A minimum cost detector 3017 detects $i_{min}$ which affords the minimum value concerning 'i' of $J^*(i, j)$ in the minimum cost file 3016, every running distance 'j'. A compensated position calculator 3018 loads the coordinates of a position on the map corresponding to $i_{min}$, namely, the optimal matching point of the vehicular distance 'j', from the road data coordinate file 3014, and delivers them to the picturization means 307, thereby to display the vehicular position as a compensated position in superposition on the map coordinates indicated on the image display device 303, and it also delivers them to the input device 305, thereby to read out road data centering around the vehicular position. Besides, each time $i_{min}$ increases with the proceeding of the vehicle, the road direction calculator 3012 for the $\Delta S$ intervals evaluates a road direction and coordinate data corresponding to an increment and supplements them to the road direction data file 3013 and the road coordinate data file 3014. Incidentally, the DP calculator 3015 checks the computed cost $J^*(i, j)$, and it stops the DP calculations as illustrated in FIG. 24(b) when the cost has exceeded a threshold value $\alpha$. In a case where, as shown in FIG. 23, all the costs $J^*(i, j)$ concerning the running distance 'j' have exceeded the threshold value $\alpha$ after branching at an intersection, the computation of the road direction data on this branching is not executed thenceforth.

Owing to the repetition of the above operations, the vehicular position compensated by the optimum matching as the route is displayed on the image display device 303 every moment with the running of the vehicle.

According to Embodiment 9, when a vehicular position is estimated from on-board sensor data in an on-board navigation system, the global matching between an on-board sensor data sequence and map road data and the correction of an estimated vehicular position are made by a DP matching technique. This is effective to provide the on-board navigation system which lowers the possibility of the failure of the vehicular position estimation attributed to insufficiency in the map data and sensor errors and in which temporary mismatching can be corrected by a posterior global judgement.

What is claimed is:

1. A navigation method using map data in a system which has at least one of first detection means for detecting a running distance of a vehicle and a second detection means for detecting an azimuth of the vehicle, a first memory for storing the map data, a data processor, and a second memory, comprising the steps of:
   continuously detecting data, at periodic intervals, of at least one of the running distance and the azimuth by the corresponding detection means;
   deciding a quantization unit in any area in said map, corresponding to a current position of the vehicle calculated on the basis of the data detected in said detecting step, wherein said map includes roads and off-road locations, and quantization units each having a conditional probability of location of the vehicle;
   calculating a probability density of the decided quantization unit, for each quantization unit decided in said deciding step, using said data processor on the basis of the corresponding map data and the detected data which has been obtained by said detecting step; and
   correcting said current position corresponding to the decided quantization unit, based upon the calculated probability density, for each calculated probability density of the calculating step.

2. A navigation method using map data s defined in claim 1, wherein the calculated probability density is a conditional probability density of the vehicular position at a current time calculated in accordance with the data detected by said step of detecting, which data have been obtained until the current time since a start time of the calculation of the vehicular position.

3. A navigation method using map data as defined in claim 1, wherein the calculated probability density is a conditional probability density of a vehicular position series in an identical time interval calculated in accordance with the data detected by said step of detecting, which data have been obtained until the current time since a start time of the calculation of the vehicular position.

4. A navigation method using map data as defined in claim 1, wherein said step of calculating the probability density comprises a step of calculating a numerical conditional probability density representing the probability of the vehicular position at a next time as a function of the vehicular position at a current time, and in accordance with the use of a probable vehicular position indicated by the conditional probability of location of the corresponding quantization unit in the map data.

5. A navigation method using map data as defined in claim 1, further comprising the step of displaying on an image display device an image which is prepared from the map data and the calculated probability density of the vehicular position.

6. A navigation method using map data as defined in claim 1, further comprising the step of generating a voiced instruction which is synthesized in accordance with the map data and the calculated probability density of the current vehicular position.

7. A navigation method using map data as defined in claim 1, further comprising the step of receiving an initial vehicular position, whether the vehicle is on a road in the map or off a road in the map, at a start time of the calculation of the vehicular position, and the step of calculating an initial probability density in said data processor on the basis of the initial vehicular position.

8. A navigation method using map data as defined in claim 1, wherein an astronomical sensor is employed as the vehicular azimuth detection means.

9. A navigation method using map data as defined in claim 1, further comprising:
   a step of sensing abnormal detection data by comparing the estimated current positions calculated according to output data of said first detection means and said second detection means; and
   a step of determining if the comparison indicates a predefined discrepancy at the compared positions.

10. A navigation method using map data as defined in claim 1, wherein besides said detection means, at least one third detection means for detecting data on the vehicular position is provided, so as to be used for said step of calculating the probability density.

11. A navigation method using map data as defined in claim 1, wherein a sensor for an inclination angle of a body of the vehicle is employed as said third detection means.

12. A navigation method using map data as defined in claim 10, further comprising:
   a step of sensing an abnormality by comparing probability densities of the vehicular position calculated according to data from each of said first and second detection means; and
   a step of further comparing each of the probability densities calculated according to data from said first and second means with a probability density calculated in accordance with data from a third detection means.

13. A navigation method using map data as defined in claim 1, wherein the map data includes locations, connective relations and attributes of nodes and links that constituted roads, speed limits, and diversion probabilities of traffic flows.

14. A navigation method using map data as defined in claim 13, wherein said map data further includes auxiliary information items that are externally written.

15. A navigation method using map data as defined in claim 14, wherein the auxiliary information items are stored in a rewritable memory.

16. A navigation method using map data as defined in claim 14, wherein some of the auxiliary information items contain data errors resulting from data obtained by one of said first and second detection means.

17. A navigation method using map data as defined in claim 4, wherein the numerical conditional probability density represents the probability that the vehicle is at a particular location, and has a value that is determined to be non-zero when it is apparent that the vehicle runs only through roads in the map data.

18. A navigation method using map data as defined in claim 4, wherein said step of calculating a numerical conditional probability density further comprises:
a step of changing-over the numerical conditional probability density calculating step to a step of calculating the conditional probability density to be a non-zero value when the vehicle is on roads, in the map data, and a zero value when the vehicle is off roads, in the map data, when the vehicle only runs on roads on the map.

19. A navigation method using map data as defined in claim 1, wherein said first detection means is a speed sensor, said second detection means is a vehicular azimuth sensor, said first memory is a road map data memory, and said step of detecting at least one of the running distance and the azimuth includes sensing a speed and an azimuth of a vehicle by means of said speed sensor and said vehicular azimuth sensor, respectively, the method further comprising the steps of:
estimating a current estimative position of the vehicle on the basis of the sensed speed and azimuth and the corresponding map data;
storing, in said second memory, coordinates of a plurality of places on a road as the estimated current positions of the vehicle, together with their calculated probability density; and
iteratively updating the estimated vehicular position by evaluating an estimative vehicular position at a next time and the calculated probability density corresponding thereto, from the sensed speed and azimuth and the corresponding road map data on the basis of the estimated current position and the calculated probability density corresponding thereto.

20. A navigation method using map data as defined in claim 1, wherein said first detection means is a speed sensor, said second detection means is a vehicular azimuth sensor, said memory is a road map data memory, and said step of detecting at least one of the running distance and the azimuth includes sensing a speed and an azimuth of a vehicle by means of said speed sensor and said vehicular azimuth sensor, respectively, further comprising:
a DP matching calculation step of estimating a current estimative position of the vehicle and its calculated probability density corresponding thereto, on the basis of the sensed speed and azimuth and the map data; and
a step of storing, in said second memory, coordinates of the estimated current position of the vehicle and the calculated probability density corresponding thereto.

21. A navigation method using map data as defined in claim 19, further comprising the step of selecting the estimated vehicular position whose calculated probability density is higher than that of other estimated vehicular positions as a representative point, and displaying the estimated vehicular position on an image display device.

22. A navigation method using map data as defined in claim 20, further comprising the step of selecting the estimated vehicular position whose calculated probability density is higher than that of other estimated vehicular positions as a representative point, and displaying the selected estimated vehicular position on an image display device.

23. A navigation method using map data as defined in claim 19, wherein said step of iteratively updating the estimated vehicular position includes a final stage calculation of DP matching between route data obtained from on-board sensor data from a running start point up to a current time and at least one candidate route on the road map data.

24. A navigation method using map data as defined in claim 19, wherein the step of storing the calculated probability density further comprises:
a step of storing the calculated probability density at DP matching calculating stages of predetermined number on a maximum probability route leading to each of the estimated vehicular positions; and
a step of increasing, on account of the probability density concerning the initial stages of the predetermined number, a calculated probability density concerning the estimated vehicular position at a next time.

25. A navigation method using map data as defined in claim 20, wherein the step of storing the calculated probability density further comprises:
a step of storing the calculated probability density at DP matching calculation stages of predetermined number on a maximum probability route leading to each of the estimated vehicular positions; and
a step of increasing, on account of the probability density concerning the initial stages of the predetermined number, a calculated probability density concerning the estimated vehicular position at a next time.

26. A location method for a vehicle in a system which has at least one of first detection means for detecting a running distance of the vehicle and second detection mans for detecting an azimuth of the vehicle, and a memory for storing map data, comprising the steps of:
continuously detecting data, at periodic intervals, concerning at least one of the running distance and the azimuth by the corresponding detection means;
deciding a quantization unit in any area in said map, corresponding to a current position of the vehicle calculated on the basis of the data detected in said detecting step, wherein said map includes roads and off-road locations, and quantization units each having a conditional probability of location of the vehicle;
calculating a probability density of the decided quantization unit using calculation means carried on the vehicle, for each quantization unit decided in said deciding step, and on the basis of the corresponding map data and the detected data which has been obtained by said detecting step;
sending the calculated probability density to a center device; and
correcting said current position corresponding to the decided quantization unit, based upon the calculated probability density, for each calculated probability density of the calculating step.

27. A location method for a vehicle as defined in claim 26, wherein said detecting step is carried out on the vehicle, and the output thereof is sent to said center device so as to calculate the vehicular position in said center device.

28. A location method for a vehicle as defined in claim 27, wherein the vehicular position calculated by said center device is sent back to the vehicle.

29. A location method for a vehicle as defined in claim 27, wherein said center device executes at least a processing function of said detecting step.

30. A location method for a vehicle as defined in claim 27, further comprising the steps of:
   storing an estimated value of the vehicular position on the basis of the calculated probability density, in a memory, and retrieving and displaying the estimated value.

31. A location method for a vehicle as defined in claim 27, further comprising:
   the step of displaying the calculated probability density on an image display device in superposition on the map data.

32. A navigation method using map data, which has at least one of first detection means for detecting a running distance of a vehicle and second detection means for detecting an azimuth of the vehicle, a memory for storing the map data, a data processor, and a buffer memory, comprising:
   means for continuously detecting, at periodic intervals, at least one of the running distance and the azimuth by the corresponding detection means;
   means for deciding a quantization unit corresponding to a current position of the vehicle in any area in said map, said map including roads and off-road locations, with which a probability computation determined by a specific detection accuracy of said detection means and quantization of the map data can be executed;
   means for calculating a probability density of the decided quantization unit by said data processor, for each quantization unit decided by said deciding means, on the basis of the map data and said at least one the running distance and the azimuth which has been obtained by said means for detecting at least one of the running distance and the azimuth; and
   means for correcting said current position corresponding to the decided quantization unit, based upon the calculated probability density for each probability density calculated by the calculating means.

33. A location system for a vehicle, which has at least one of first detection means for detecting a running distance of the vehicle and second detection means for detecting an azimuth of the vehicle, and a memory for storing map data, comprising:
   means for continuously detecting at periodic intervals, at least one of the running distance and the azimuth by the corresponding detection means;
   means for deciding a quantization unit corresponding to a current position of the vehicle in any area in said map, said map including roads and off-road locations, with which a probability computation determined by a specific detection accuracy of said detection means and quantization of the map data can be executed;
   means carried on the vehicle for calculating a probability density of the decided quantization unit, for each quantization unit decided by said deciding means, on the basis of the map data and the detected value which has been obtained by said means for detecting at least one of the running distance and the azimuth;
   means for sending the calculated probability density to a center device; and
   means for correcting said current position corresponding to the decided quantization unit, based upon the calculated probability density for each probability density calculated by the calculating means.

34. A navigation system using map data in a system which has first detection means having a speed sensor, for detecting a running distance of a vehicle, and second detection means including a vehicular azimuth sensor, for detecting an azimuth of the vehicle, a first memory for storing the map data, a data processor, and a second memory, comprising:
   means for continuously detecting data, at periodic intervals, concerning at least one of the running distance and the azimuth by the corresponding detection means;
   means for deciding a quantization unit in any area in said map, corresponding to a current position of the vehicle calculated on the basis of the data detected by said detecting means, wherein said map includes roads and off-road locations, and quantization units each having a conditional probability of location of the vehicle;
   means for calculating a probability density of the decided quantization unit, for each quantization unit decided by said deciding means, on the basis of the corresponding map data and the detected data which has been obtained by said first or second detection means;
   means for storing the calculated probability density in said second memory;
   means for sensing a speed and an azimuth of a vehicle by said speed sensor and said vehicular azimuth sensor, respectively;
   means for estimating a current estimative position of the vehicle on the basis of the sensed speed and azimuth and the map data;
   means for correcting said current position corresponding to the decided quantization unit, based upon the calculated probability density for each probability density calculated by the calculating means;
   means for storing coordinates of a plurality of places on a road as the estimated current positions of the vehicle, together with the calculated probability density of the respective estimated vehicular positions; and
   means for iteratively updating the estimated vehicular position by evaluating an estimative vehicular position at a next time and the calculated probability density corresponding thereto, from the sensed speed and azimuth and the road map data on the basis of the estimated current position and the calculated probability density corresponding thereto.

35. A navigation system using map data in a system which has first detection means having a speed sensor, for detecting a running distance, of a vehicle and second detection means including a vehicular azimuth sensor, for detecting an azimuth of the vehicle, a first memory for storing the map data, a data processor, and a second memory, comprising:
   means for detecting data concerning at least one of the running distance and the azimuth by the corresponding detection means;
   means for deciding a quantization unit in an area in said map, corresponding to a current position of the vehicle calculated on the basis of the data detected by said detecting means, wherein said map includes roads and off-road locations, and quantization units each having a conditional probability of location of the vehicle;

means for calculating a probability density of the decided quantization unit on the basis of the corresponding map data and the detected data which has been obtained by said first or second detecting means;

means for storing the calculated probability density in said second memory;

means for sensing a speed and an azimuth of a vehicle by said speed sensor and said vehicular azimuth sensor, respectively;

DP matching calculation means for estimating a current estimative position of the vehicle and a corresponding calculated probability density of the current estimative position on the basis of the sensed speed and azimuth and the map data; and means for storing, in said second memory, coordinates of the estimated current position of the vehicle and the calculated probability density corresponding to the estimated vehicular position.

* * * * *